US012579190B2

(12) United States Patent
Liu et al.

(10) Patent No.: US 12,579,190 B2
(45) Date of Patent: Mar. 17, 2026

(54) DATA STORAGE METHOD AND APPARATUS, COMPUTER DEVICE, PRODUCT, AND STORAGE MEDIUM

(71) Applicant: TENCENT TECHNOLOGY (SHENZHEN) COMPANY LIMITED, Shenzhen (CN)

(72) Inventors: Jianpeng Liu, Shenzhen (CN); Jie Jiang, Shenzhen (CN); Yuhong Liu, Shenzhen (CN); Peng Chen, Shenzhen (CN); Xiaosen Li, Shenzhen (CN); Yong Cheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/914,454

(22) Filed: Oct. 14, 2024

(65) Prior Publication Data

US 2025/0036685 A1    Jan. 30, 2025

Related U.S. Application Data

(63) Continuation of application No. PCT/CN2023/136993, filed on Dec. 7, 2023.

(30) Foreign Application Priority Data

Dec. 20, 2022    (CN) .......................... 202211643683.3

(51) Int. Cl.
G06F 16/901 (2019.01)
(52) U.S. Cl.
CPC ................................ G06F 16/9027 (2019.01)
(58) Field of Classification Search
CPC ............. G06F 16/9027; G06F 16/9024; G06F 3/0676; G06F 16/901

(Continued)

(56) References Cited

U.S. PATENT DOCUMENTS 5,414,839 A * 5/1995 Joshi ....................... G06F 9/526
                                                         710/200
10,242,065 B1 3/2019 Starling et al.
(Continued)

FOREIGN PATENT DOCUMENTS

CN    109446362 A    3/2019
CN    111190904 A    5/2020
(Continued)

OTHER PUBLICATIONS

International Search Report with English translation and Written Opinion regarding PCT /CN2023/136993 dated Feb. 21, 2024,10 pages.

(Continued)

*Primary Examiner* — Phong H Nguyen
(74) *Attorney, Agent, or Firm* — Crowell & Moring LLP

(57)    ABSTRACT

Methods, apparatus, computer devices, products, and storage medium are described for generating tree-structure storage data for a graph structure, applicable to the fields of cloud computing or the Vehicle of Internet. One method includes: obtaining data of a graph structure comprising vertex data of at least one vertex of the graph structure and edge data of at least one edge of the graph structure; constructing memory data of a tree structure for the data of the graph structure in a memory of the computer device; constructing a plurality of disk blocks in a storage device based on the memory data of the tree structure; and storing the data of the root node, the data of each first-subnode, and data of a subtree using each second-subnode as a root node into corresponding disk blocks respectively, to obtain the storage data of the tree structure for the graph structure.

18 Claims, 24 Drawing Sheets

(58) Field of Classification Search
USPC .......................... 707/737, 741, 778, 797, 803
See application file for complete search history.

(56) References Cited

U.S. PATENT DOCUMENTS

| | | | |
|---|---|---|---|
| 2002/0087550 A1* | 7/2002 | Carlyle ................. | G06F 16/353 707/999.01 |
| 2008/0122853 A1* | 5/2008 | Brown ................. | G06F 9/5088 345/522 |
| 2008/0144471 A1* | 6/2008 | Garapati ................... | G06F 8/63 369/99 |
| 2013/0232306 A1* | 9/2013 | Dhuse ................. | G06F 16/2228 711/154 |
| 2013/0325798 A1* | 12/2013 | Yuan ................... | G06Q 10/107 707/609 |
| 2020/0117728 A1* | 4/2020 | Tomlinson .......... | G06F 16/2246 |

FOREIGN PATENT DOCUMENTS

| | | |
|---|---|---|
| CN | 114254164 A | 3/2022 |
| CN | 115408547 A | 11/2022 |
| CN | 116975169 A | 10/2023 |

OTHER PUBLICATIONS

Extended European Search Repod (PCT/ISA/210) issued in Application No. EP 23 90 5709 dated Dec. 15, 2025, (9 pages).

* cited by examiner

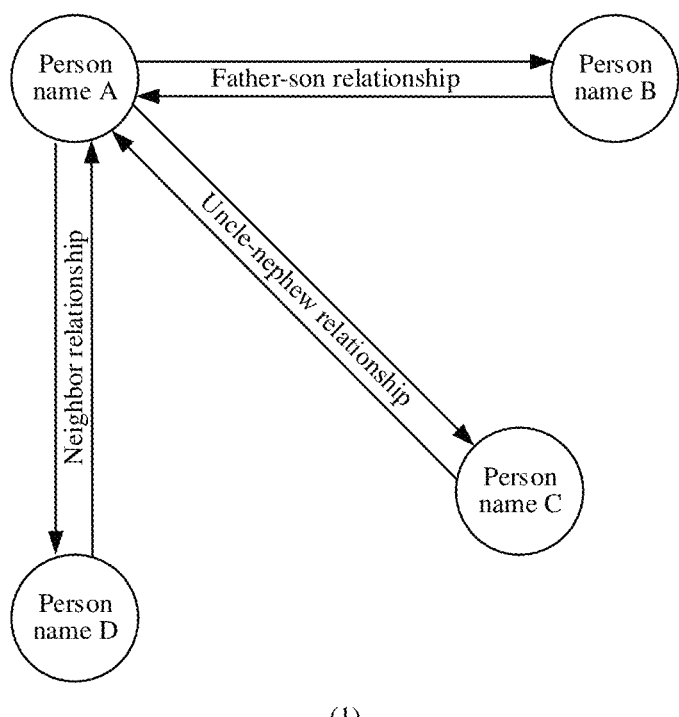

(1)

| Key | Value | | |
|---|---|---|---|
| Person name A | Age A | Appearance A | Height A |
| Person name B | Age B | Appearance B | Height B |
| Person name C | Age C | Appearance C | Height C |
| Person name D | Age D | Appearance D | Height D |

| Key | | Value |
|---|---|---|
| Person name A | Father-son relationship | Father, 25 years apart |
| Person name B | Father-son relationship | Son, 25 years apart |
| Person name A | Uncle-nephew relationship | Uncle, contact frequency is greater than a threshold |
| Person name C | Uncle-nephew relationship | Nephew, contact frequency is greater than a threshold |
| Person name A | Neighbor relationship | Upstairs, for 5 years |
| Person name D | Neighbor relationship | Downstairs, for 5 years |

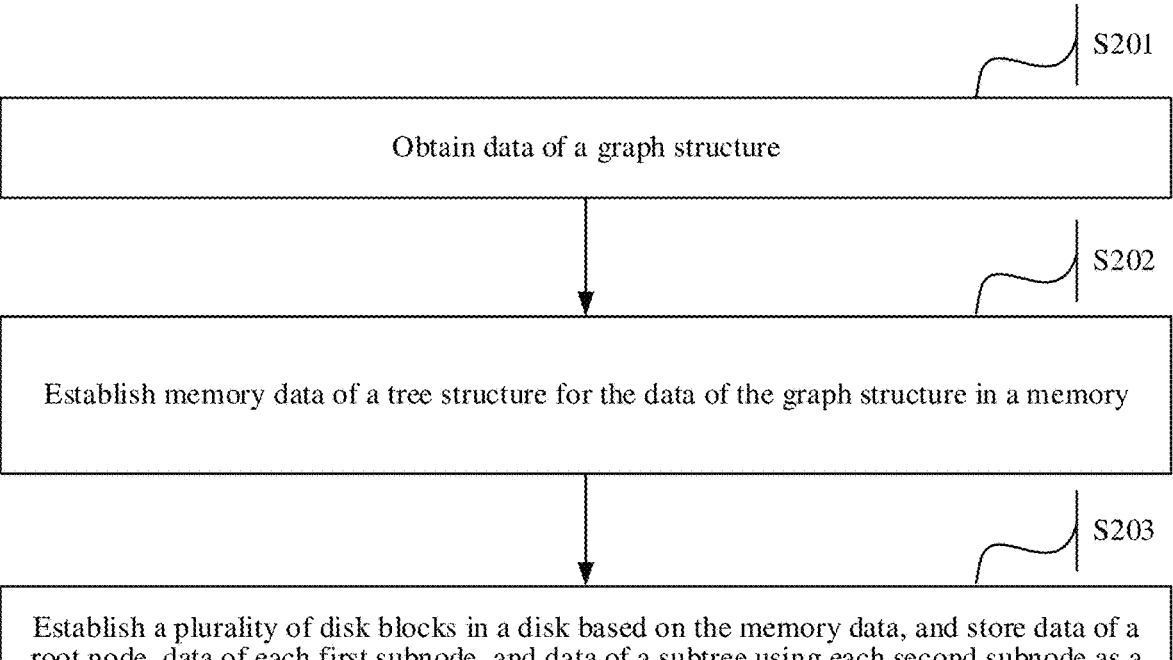

S201

Obtain data of a graph structure

S202

Establish memory data of a tree structure for the data of the graph structure in a memory

S203

Establish a plurality of disk blocks in a disk based on the memory data, and store data of a root node, data of each first subnode, and data of a subtree using each second subnode as a root node into corresponding disk blocks respectively, to obtain disk data of the tree structure

DATA STORAGE METHOD AND APPARATUS, COMPUTER DEVICE, PRODUCT, AND STORAGE MEDIUM

RELATED APPLICATION

This application is a continuation application of PCT Patent Application No. PCT/CN2023/136993, filed on Dec. 7, 2023, which claims priority to Chinese Patent Application No. 202211643683.3, filed with the China National Intellectual Property Administration on Dec. 20, 2022, both of which are incorporated herein by reference in their entireties.

FIELD OF THE TECHNOLOGY

The present disclosure relates to the field of computer technologies, and in particular, to a data storage method and apparatus, a computer device, a product, and a storage medium.

BACKGROUND OF THE DISCLOSURE

With continuous development of science and technology, more and more devices can store to-be-stored data of a graph structure into a memory, and further store data in the memory into a disk, so that corresponding target data can be queried and read from the stored data when the target data is to be used.

In the related art, a data storage method for to-be-stored data of a graph structure is to use, in a form of a key-value pair, each vertex included in the to-be-stored data of the graph structure as a key, and use attribute information of each vertex as a value of a corresponding key for storage. Similarly, in the form of the key-value pair, a start vertex of each edge is used as a key, and respective attribute information of each edge is used as a value of a corresponding key for storage.

The present disclosure describes embodiments for generating tree-structure storage data for a graph structure, addressing at least one of the problems/issues in the present technology field, improving the efficiency of the data access and/or data search/query efficiency, improving the storage efficiency of storing graph structures in memories and/or storage devices.

SUMMARY

Embodiments of this application provide a data storage method and apparatus, a computer device, a product, and a storage medium, which is conducive to improving data access efficiency.

The present disclosure describes a method for generating tree-structure storage data for a graph structure. The method may be performed by a computer device including a memory storing instructions and a processor in communication with the memory. The method includes: obtaining data of a graph structure, the data of the graph structure comprising vertex data of at least one vertex of the graph structure and edge data of at least one edge of the graph structure; constructing memory data of a tree structure for the data of the graph structure in a memory of the computer device, by: generating, in the memory based on index information in vertex data of each vertex in the data of the graph structure, data of a root node of the tree structure and data of at least one first-subnode associated with the root node of the tree structure, the data of the root node indicating a storage position of the data of the at least one first-subnode in the memory, and data of each first-subnode comprising index information in vertex data of at least one vertex; generating, based on attribute information in the vertex data of the vertex, data of at least one second-subnode associated with each first-subnode of the tree structure, data of each second-subnode comprising attribute information in vertex data of a corresponding vertex; and generating, based on index information in edge data of each edge and attribute information in the edge data of the edge in the data of the graph structure, data of at least one third-subnode associated with each second-subnode of the tree structure, data of each third-subnode comprising attribute information and index information in edge data of at least one edge; constructing a plurality of disk blocks in a storage device based on the memory data of the tree structure; and storing the data of the root node, the data of each first-subnode, and data of a subtree using each second-subnode as a root node into corresponding disk blocks respectively, to obtain the storage data of the tree structure for the graph structure The present disclosure describes an apparatus for generating tree-structure storage data for a graph structure. The apparatus includes a memory storing instructions; and a processor in communication with the memory. When the processor executes the instructions, the processor is configured to cause the apparatus to perform: obtaining data of a graph structure, the data of the graph structure comprising vertex data of at least one vertex of the graph structure and edge data of at least one edge of the graph structure; constructing memory data of a tree structure for the data of the graph structure in a memory of the apparatus, by: generating, in the memory based on index information in vertex data of each vertex in the data of the graph structure, data of a root node of the tree structure and data of at least one first-subnode associated with the root node of the tree structure, the data of the root node indicating a storage position of the data of the at least one first-subnode in the memory, and data of each first-subnode comprising index information in vertex data of at least one vertex; generating, based on attribute information in the vertex data of the vertex, data of at least one second-subnode associated with each first-subnode of the tree structure, data of each second-subnode comprising attribute information in vertex data of a corresponding vertex; and generating, based on index information in edge data of each edge and attribute information in the edge data of the edge in the data of the graph structure, data of at least one third-subnode associated with each second-subnode of the tree structure, data of each third-subnode comprising attribute information and index information in edge data of at least one edge; constructing a plurality of disk blocks in a storage device based on the memory data of the tree structure; and storing the data of the root node, the data of each first-subnode, and data of a subtree using each second-subnode as a root node into corresponding disk blocks respectively, to obtain the storage data of the tree structure for the graph structure.

The present disclosure describes a non-transitory computer-readable storage medium, storing computer-readable instructions. The computer-readable instructions, when executed by a processor of an apparatus, are configured to cause the processor to perform: obtaining data of a graph structure, the data of the graph structure comprising vertex data of at least one vertex of the graph structure and edge data of at least one edge of the graph structure; constructing memory data of a tree structure for the data of the graph structure in a memory of the apparatus, by: generating, in the memory based on index information in vertex data of each vertex in the data of the graph structure, data of a root node of the tree structure and data of at least one first-subnode associated with the root node of the tree structure, the data of the root node indicating a storage position of the data of the at least one first-subnode in the memory, and data of each first-subnode comprising index information in vertex data of at least one vertex; generating, based on attribute information in the vertex data of the vertex, data of at least one second-subnode associated with each first-subnode of the tree structure, data of each second-subnode comprising attribute information in vertex data of a corresponding vertex; and generating, based on index information in edge data of each edge and attribute information in the edge data of the edge in the data of the graph structure, data of at least one third-subnode associated with each second-subnode of the tree structure, data of each third-subnode comprising attribute information and index information in edge data of at least one edge; constructing a plurality of disk blocks in a storage device based on the memory data of the tree structure; and storing the data of the root node, the data of each first-subnode, and data of a subtree using each second-subnode as a root node into corresponding disk blocks respectively, to obtain the storage data of the tree structure for the graph structure.

According to another aspect, a data storage method is provided, including:

obtaining data of a graph structure, the data of the graph structure including vertex data of at least one vertex of the graph structure and edge data of at least one edge of the graph structure;

establishing memory data of a tree structure for the data of the graph structure in a memory, including:

generating, in the memory based on index information in vertex data of each vertex in the data of the graph structure, data of a root node of the tree structure and data of at least one first subnode associated with the root node, the data of the root node indicating a storage position of the data of the at least one first subnode in the memory, and data of each first subnode including index information in vertex data of at least one vertex;

generating, based on attribute information in the vertex data of the vertex, data of at least one second subnode associated with each first subnode, data of each second subnode including attribute information in vertex data of a corresponding vertex; and generating, based on index information in edge data of each edge and attribute information in the edge data of the edge in the data of the graph structure, data of at least one third subnode associated with each second subnode, data of each third subnode including attribute information and index information in edge data of at least one edge; and establishing a plurality of disk blocks in a disk based on the memory data, and storing the data of the root node, the data of each first subnode, and data of a subtree using each second subnode as a root node into corresponding disk blocks respectively, to obtain disk data of the tree structure.

According to another aspect, a data storage apparatus is provided, including:

an obtaining module, configured to obtain data of a graph structure, the data of the graph structure including vertex data of at least one vertex of the graph structure and edge data of at least one edge of the graph structure; and

a processing module, configured to establish memory data of a tree structure for the data of the graph structure in the memory, including:

generating, in the memory based on index information in vertex data of each vertex in the data of the graph structure, data of a root node of the tree structure and data of at least one first subnode associated with the root node, the data of the root node indicating a storage position of the data of the at least one first subnode in the memory, and data of each first subnode including index information in vertex data of at least one vertex;

generating, based on attribute information in the vertex data of the vertex, data of at least one second subnode associated with each first subnode, data of each second subnode including attribute information in vertex data of a corresponding vertex; and generating, based on index information in edge data of each edge and attribute information in the edge data of the edge in the data of the graph structure, data of at least one third subnode associated with each second subnode, data of each third subnode including attribute information and index information in edge data of at least one edge.

The processing module is further configured to establish a plurality of disk blocks in a disk based on the memory data, and store the data of the root node, the data of each first subnode, and data of a subtree using each second subnode as a root node into corresponding disk blocks respectively, to obtain disk data of the tree structure.

According to another aspect, a computer program product is provided, including a computer program. The computer program, when executed by a processor, implements the method described in the first aspect.

According to another aspect, a computer device is provided, including:

a memory, configured to store a program instruction; and a processor, configured to invoke the program instruction stored in the memory, to perform, according to the obtained program instructions, the method described in the first aspect.

According to another aspect, a computer-readable storage medium is provided. The computer-readable storage medium has a computer-executable instruction stored therein, and the computer-executable instruction is configured to enable a computer to perform the method described in the above aspects.

BRIEF DESCRIPTION OF THE DRAWINGS

FIG. 1A shows to-be-stored data of a graph structure.

FIG. 2 is a schematic flowchart of a data storage method according to an embodiment of the present disclosure.

Figure 4A:
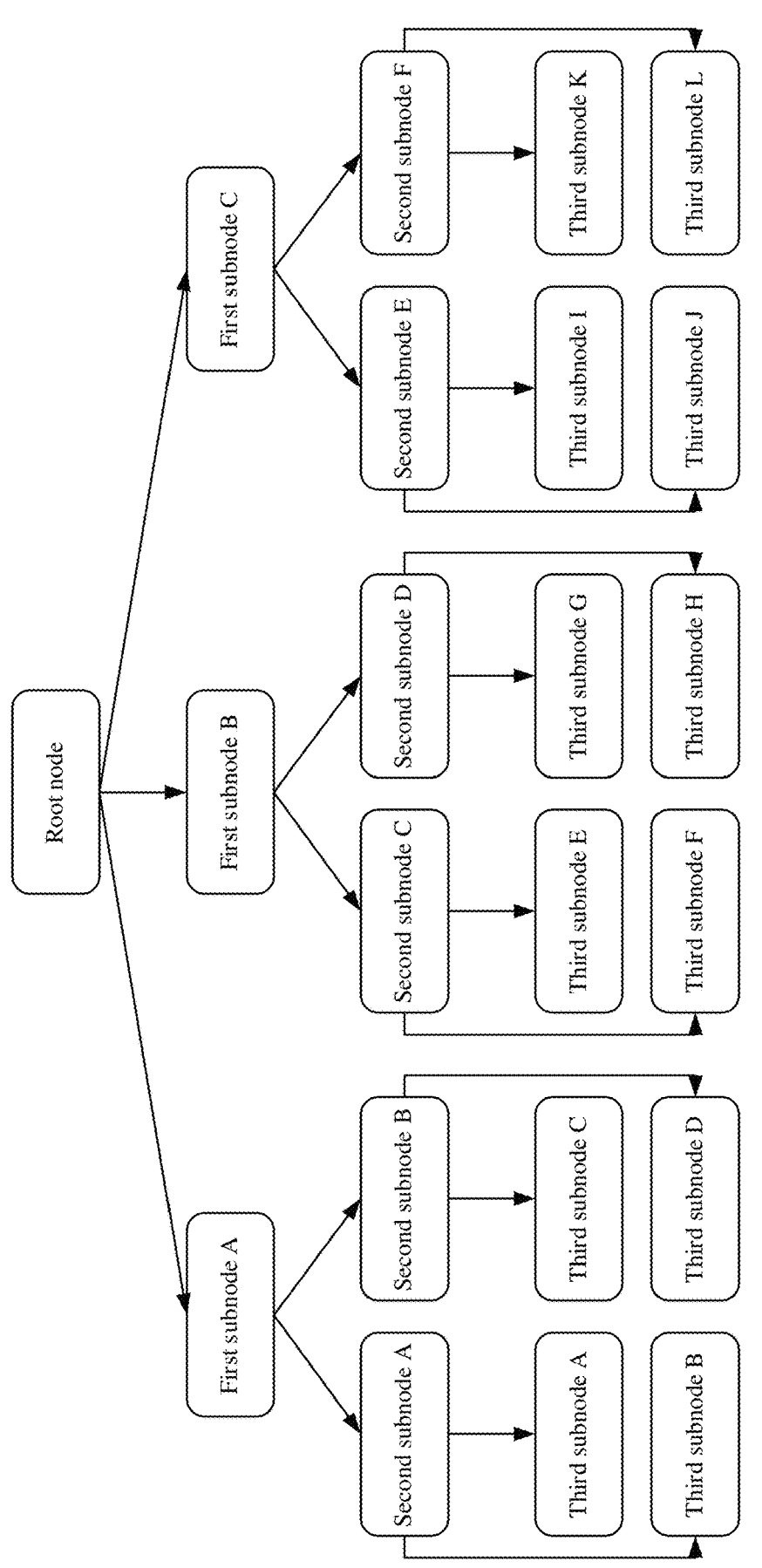
FIG. 4A is a schematic diagram of a principle of a data storage method according to an embodiment of the present disclosure.
Figure 4B:
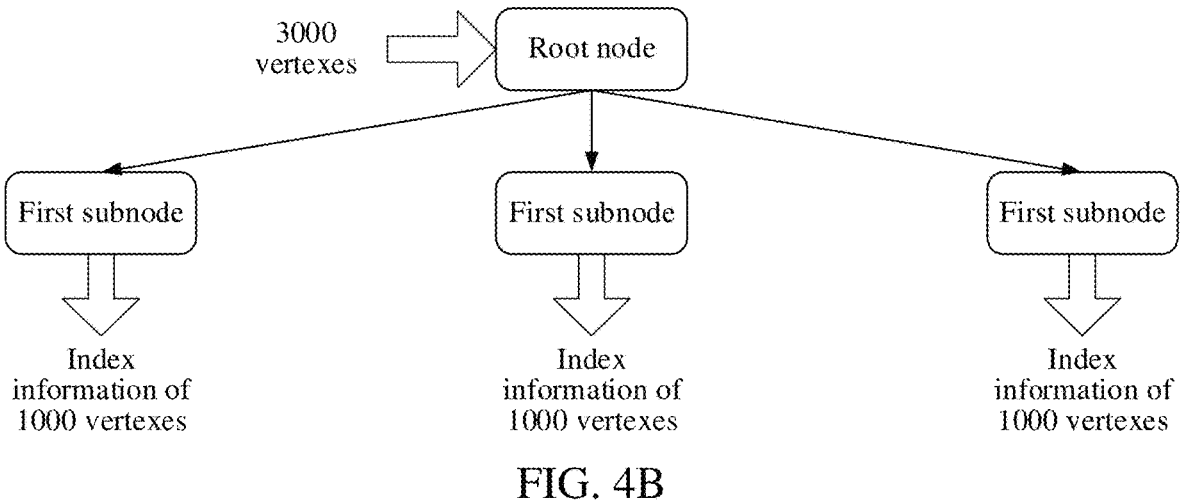
FIG. 4B is a schematic diagram of a principle of a data storage method according to an embodiment of the present disclosure.
Figure 4C:
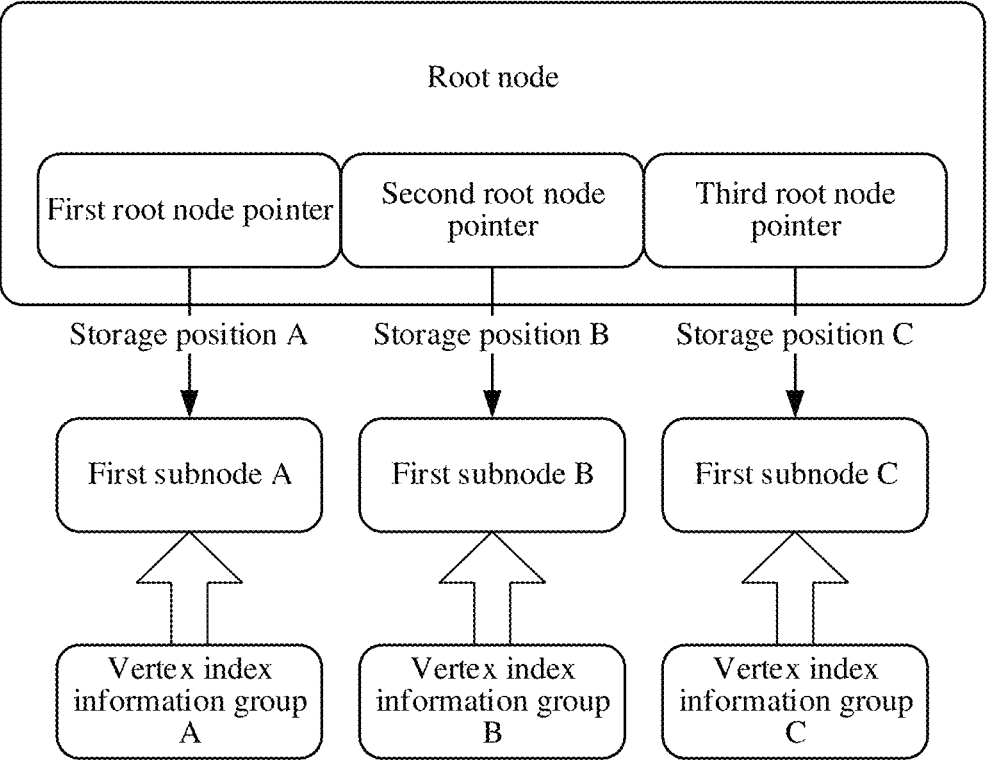
FIG. 4C is a schematic diagram of a principle of a data storage method according to an embodiment of the present disclosure.
Figure 4D:
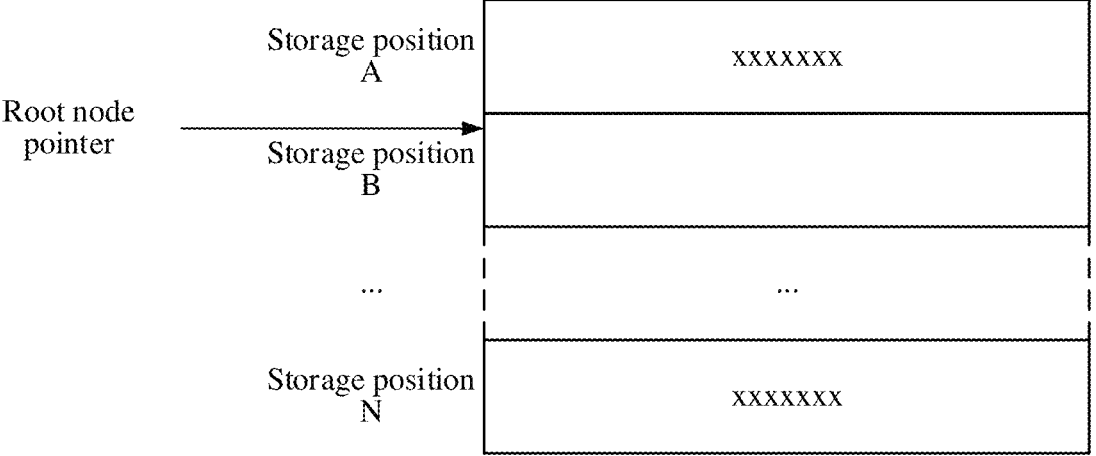

FIG. 4D is a schematic diagram of a principle of a data storage method according to an embodiment of the present disclosure.

Figure 4E:
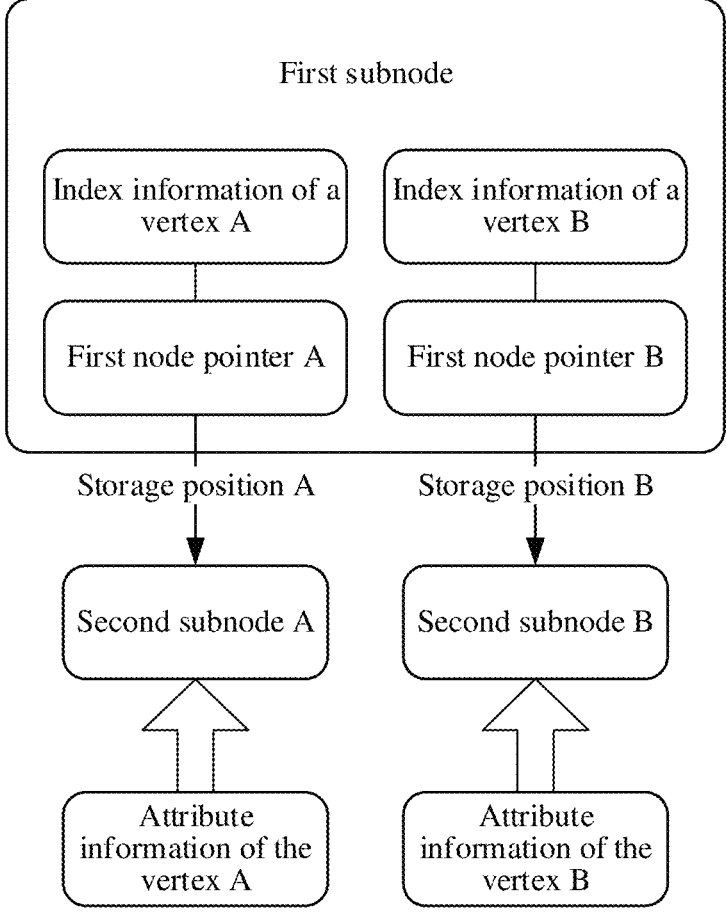

FIG. 4E is a schematic diagram of a principle of a data storage method according to an embodiment of the present disclosure.

Figure 4F:
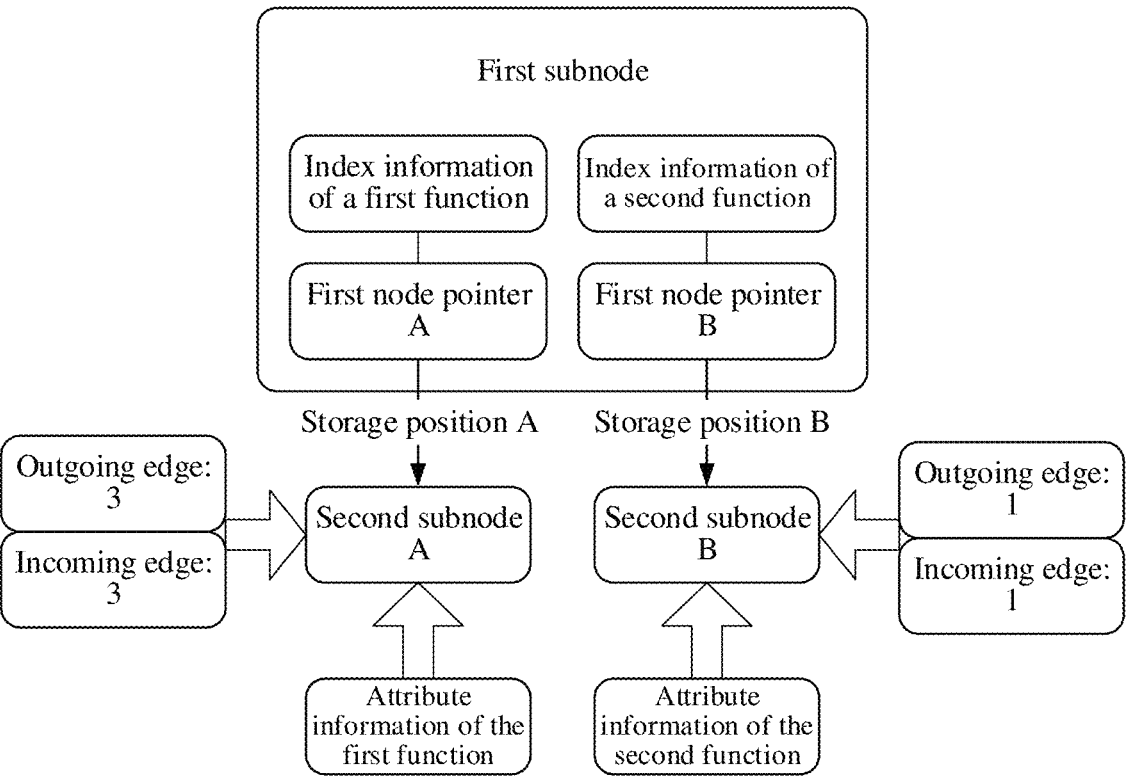

FIG. 4F is a schematic diagram of a principle of a data storage method according to an embodiment of the present disclosure.

Figure 4G:
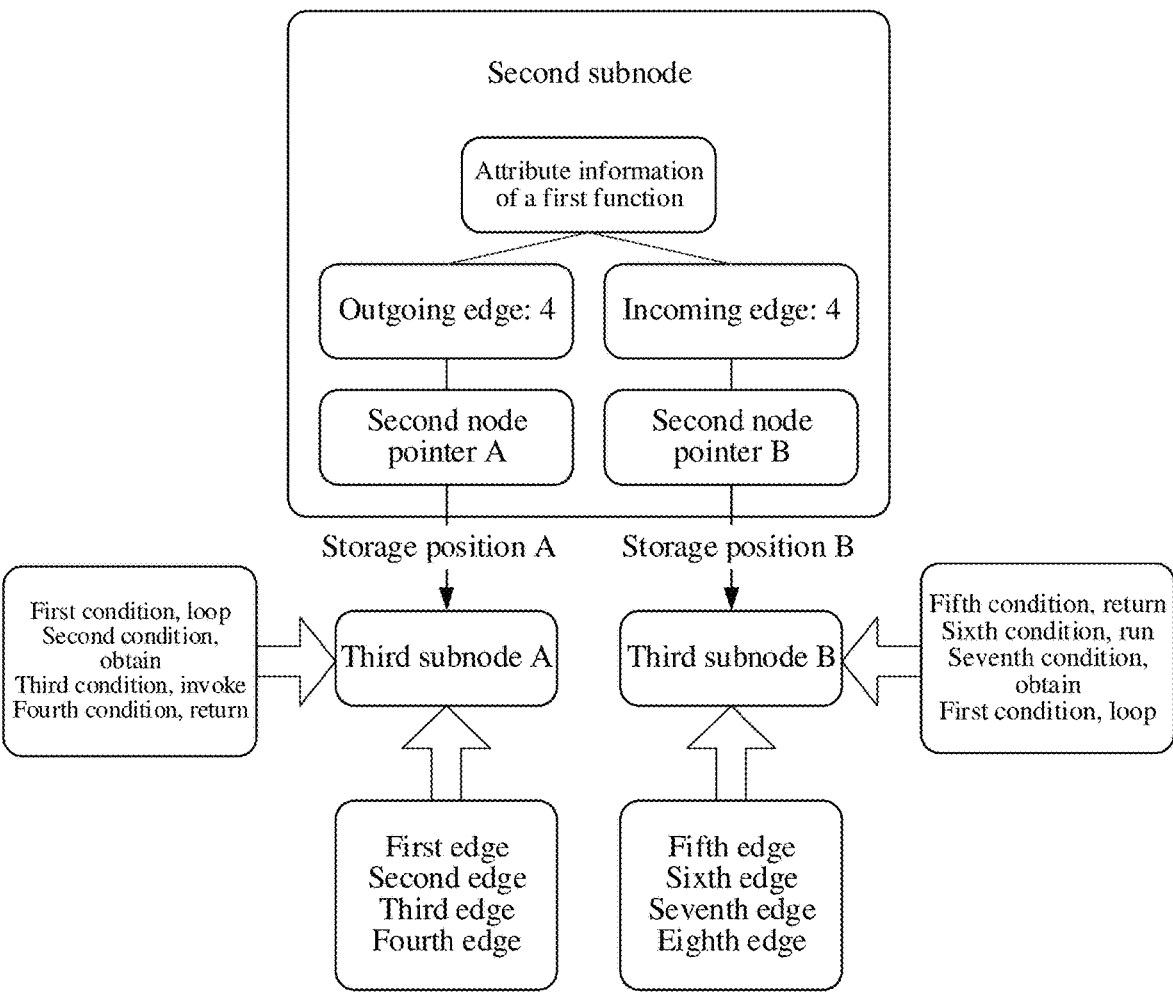

FIG. 4G is a schematic diagram of a principle of a data storage method according to an embodiment of the present disclosure.

Figure 5A:
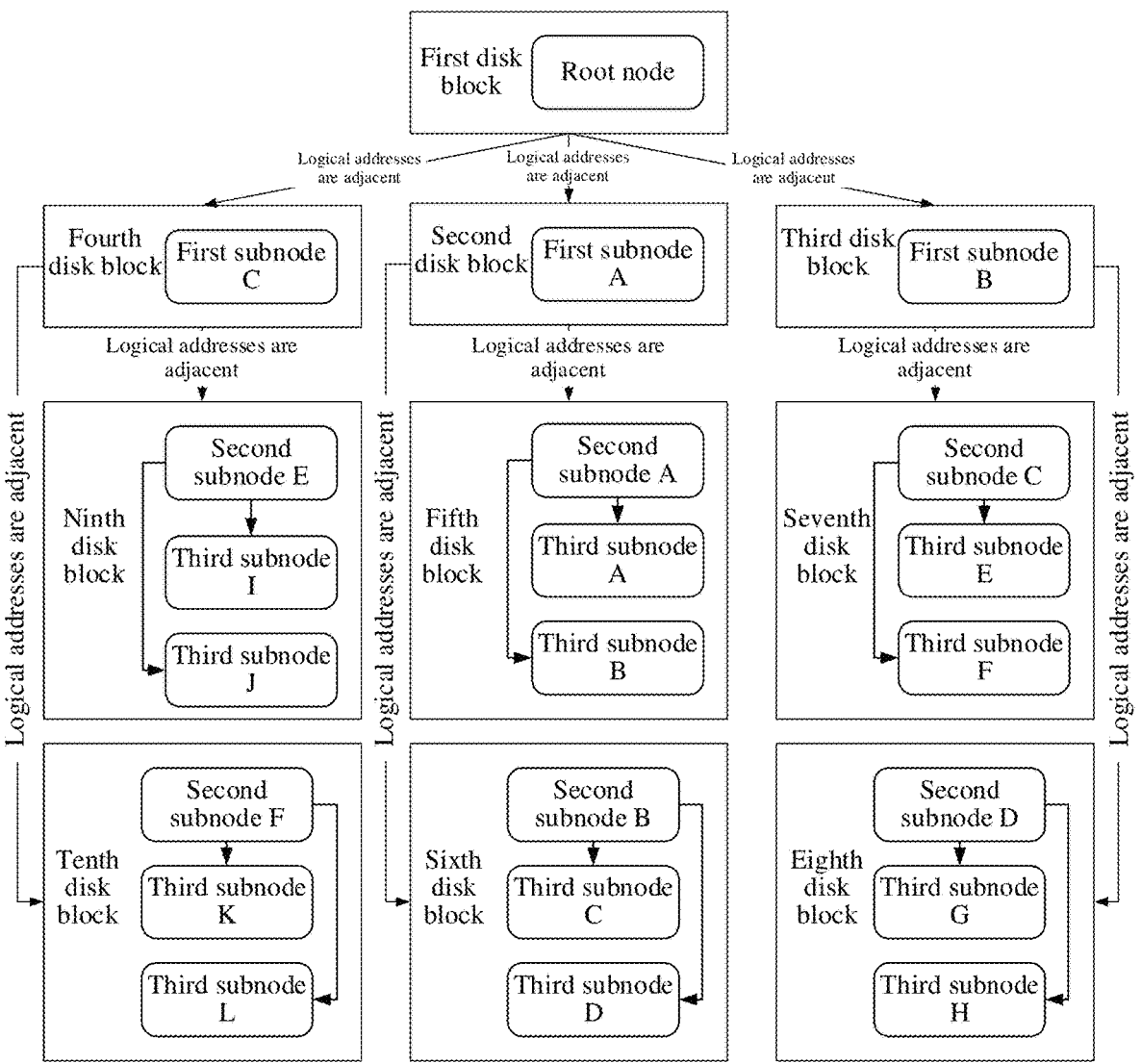

FIG. 5A is a schematic diagram of a principle of a data storage method according to an embodiment of the present disclosure.

Figure 5B:
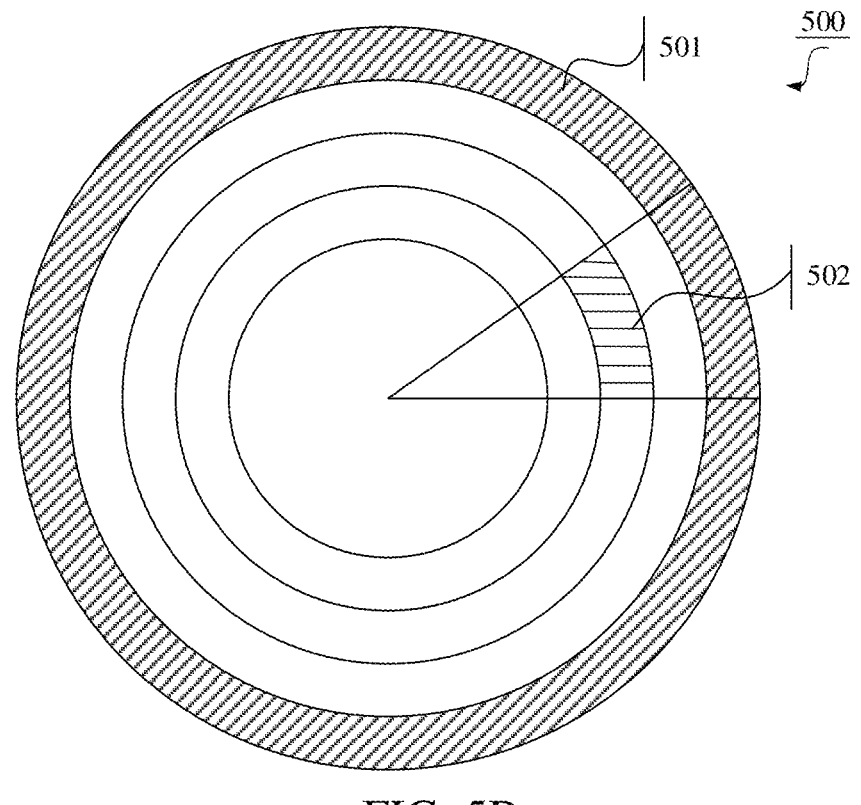

FIG. 5B is a schematic diagram of a principle of a data storage method according to an embodiment of the present disclosure.

Figure 5C:
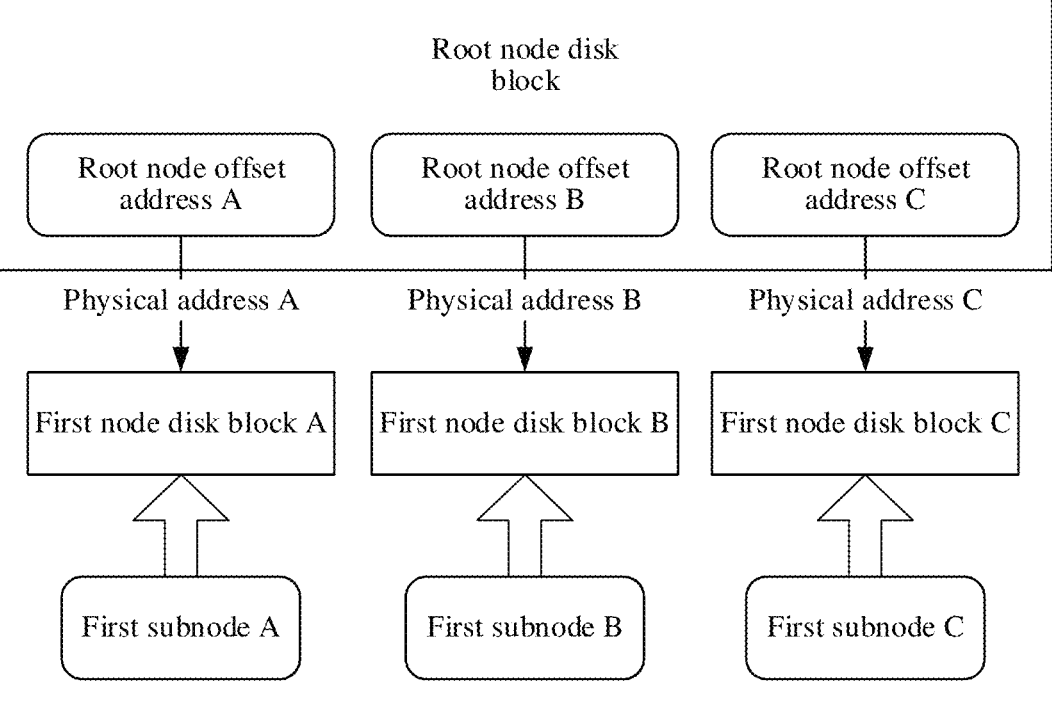

FIG. 5C is a schematic diagram of a principle of a data storage method according to an embodiment of the present disclosure.

Figure 5D:
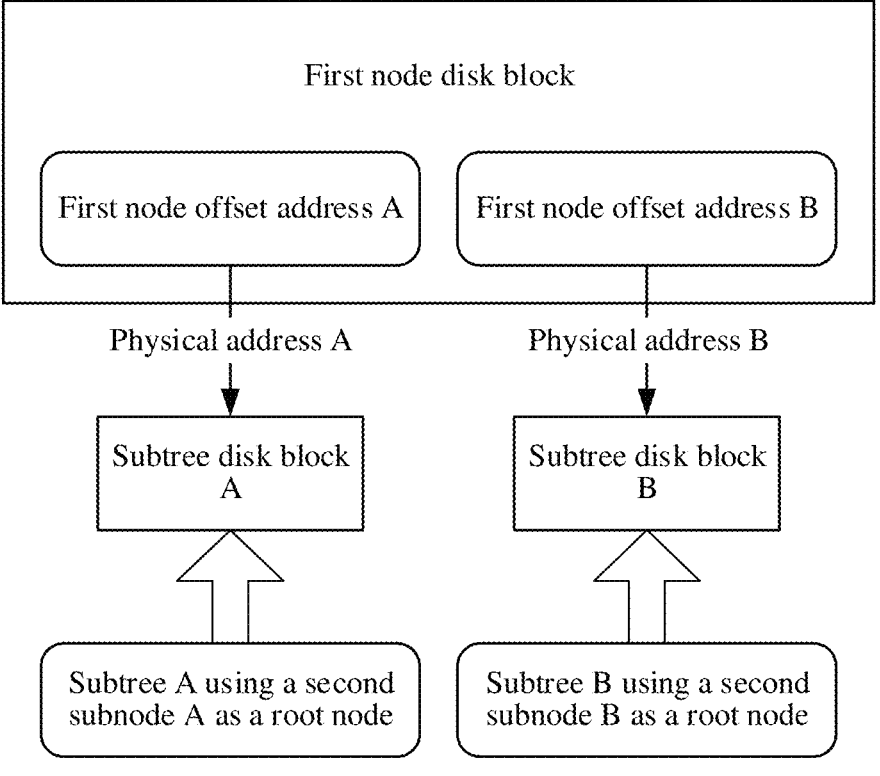

FIG. 5D is a schematic diagram of a principle of a data storage method according to an embodiment of the present disclosure.

Figure 5E:
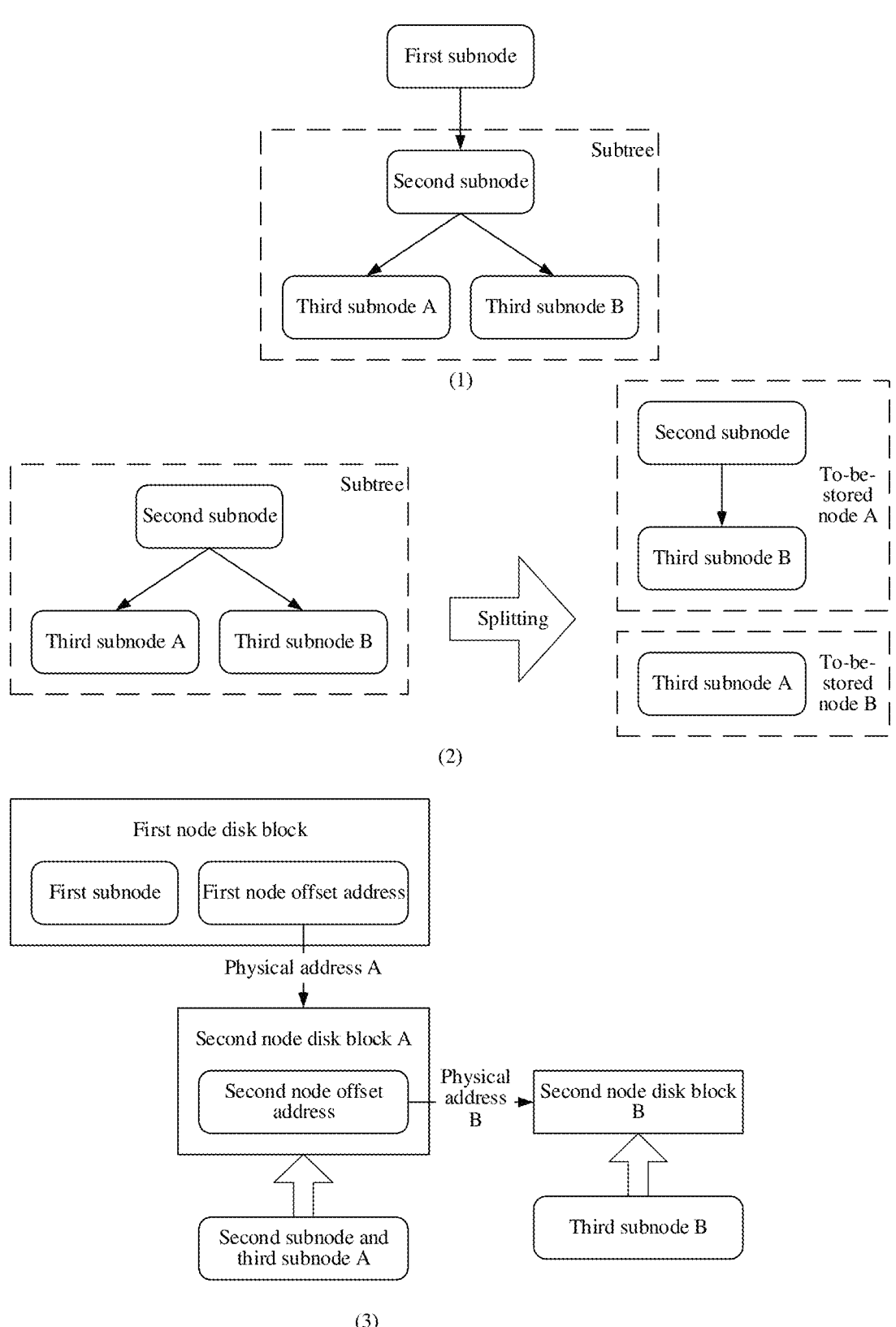

FIG. 5E is a schematic diagram of a principle of a data storage method according to an embodiment of the present disclosure.

Figure 6A:
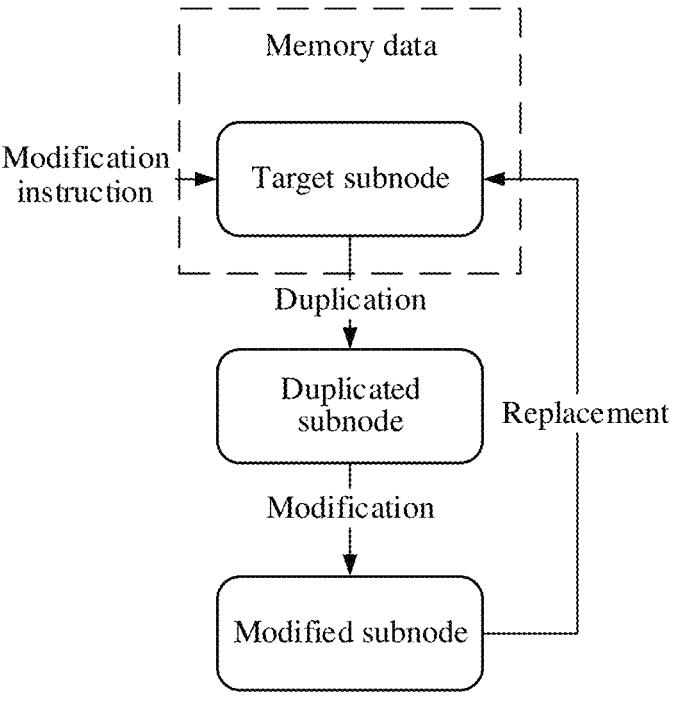

FIG. 6A is a schematic diagram of a principle of a data storage method according to an embodiment of the present disclosure.

Figure 6B:
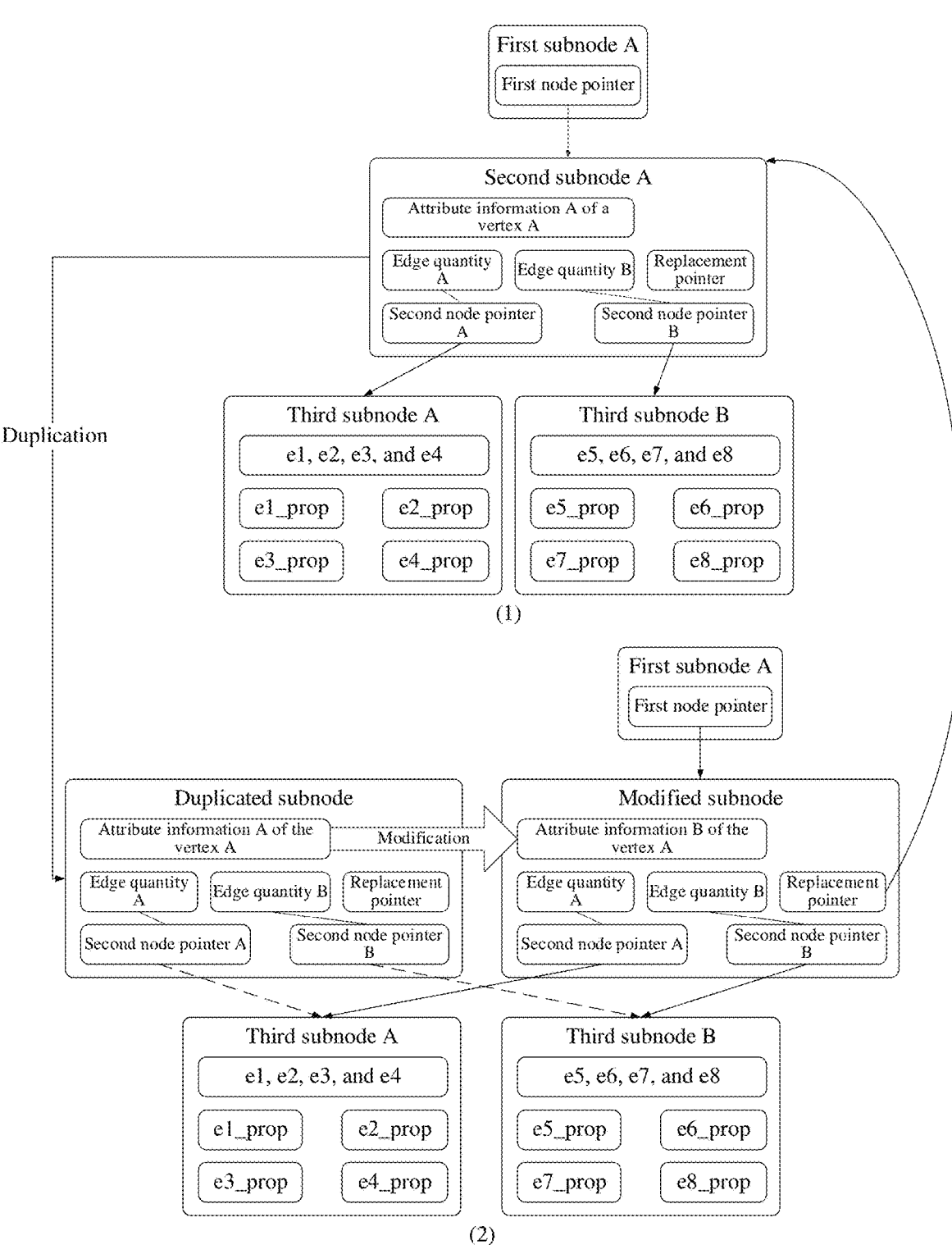

FIG. 6B is a schematic diagram of a principle of a data storage method according to an embodiment of the present disclosure.

Figure 6C:
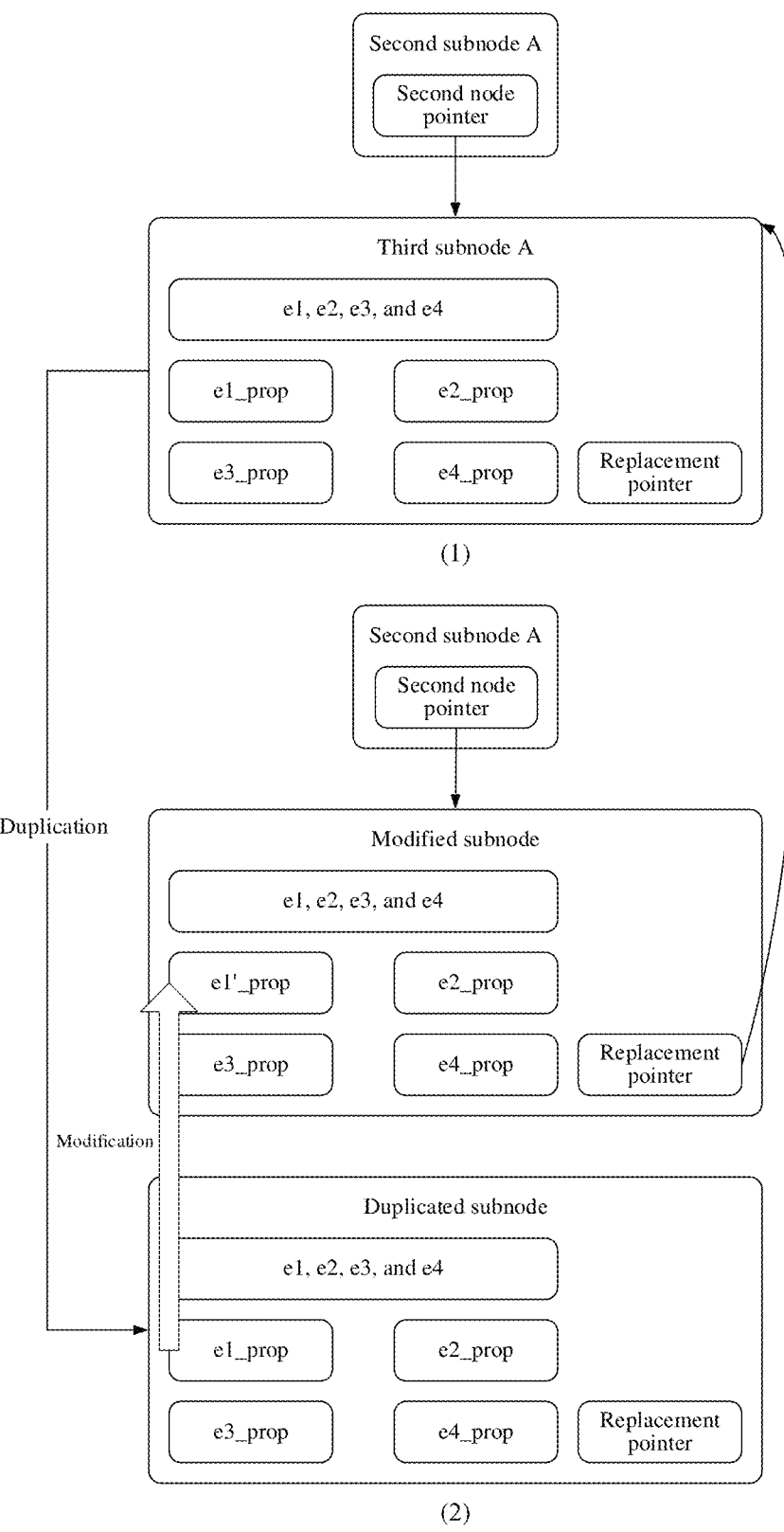

FIG. 6C is a schematic diagram of a principle of a data storage method according to an embodiment of the present disclosure.

Figure 7A:
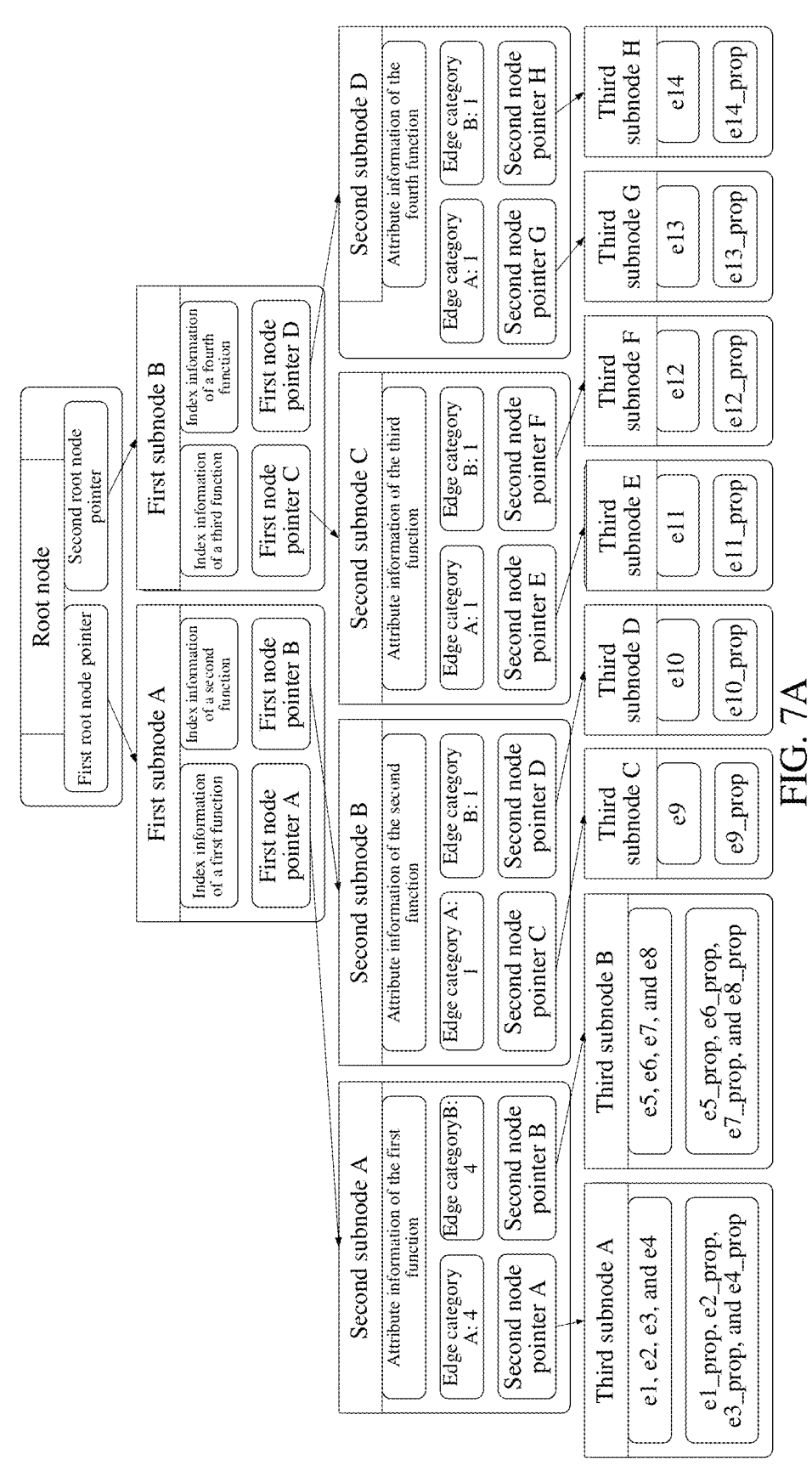

FIG. 7A is a schematic diagram of a principle of a data storage method according to an embodiment of the present disclosure.

Figure 7B:
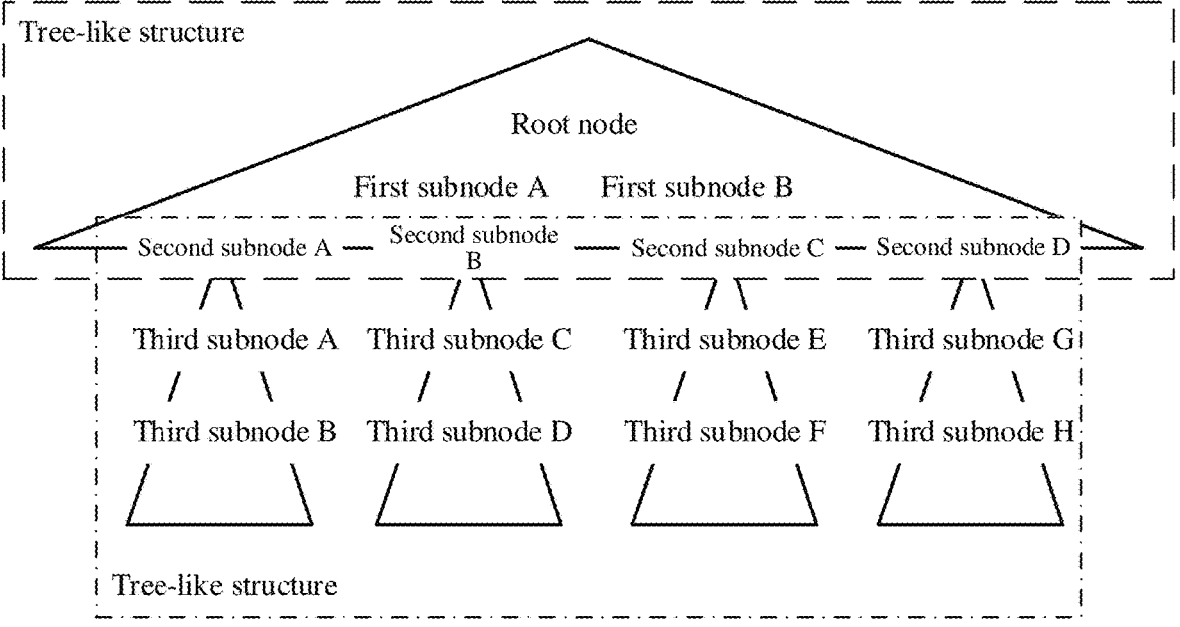

FIG. 7B is a schematic diagram of a principle of a data storage method according to an embodiment of the present disclosure.

Figure 7C:
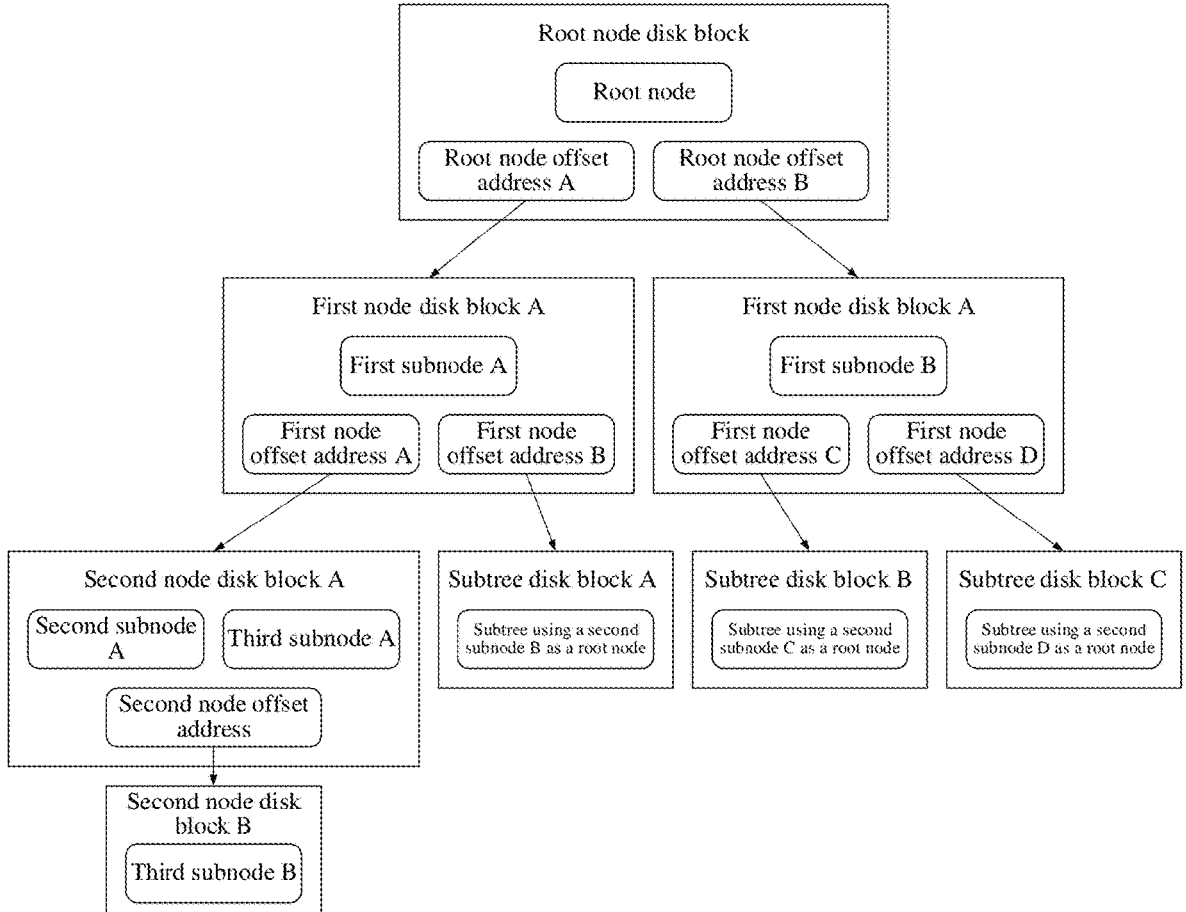

FIG. 7C is a schematic diagram of a principle of a data storage method according to an embodiment of the present disclosure.

Figure 8:
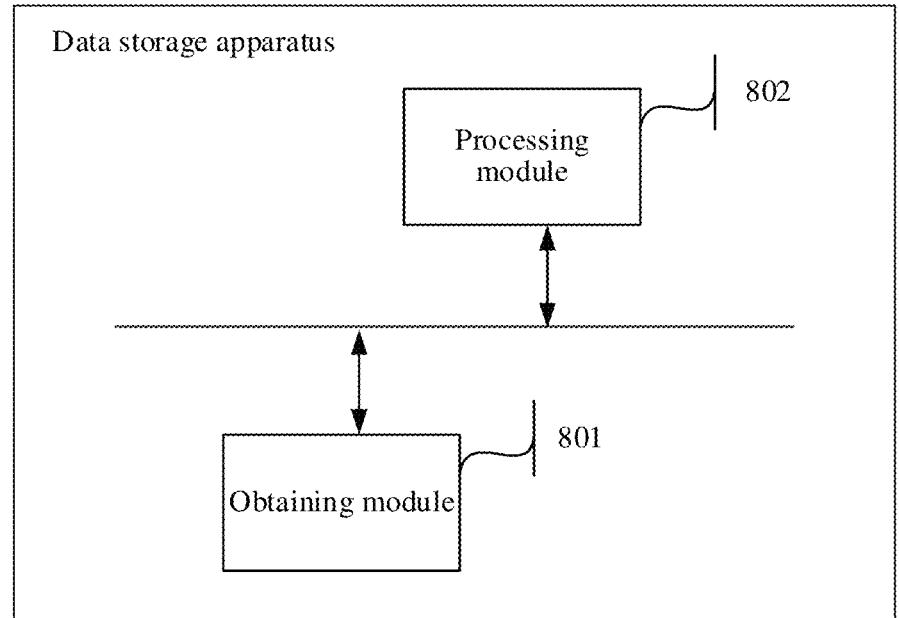

FIG. 8 is a schematic structural diagram of a data storage apparatus according to an embodiment of the present disclosure.

Figure 9:
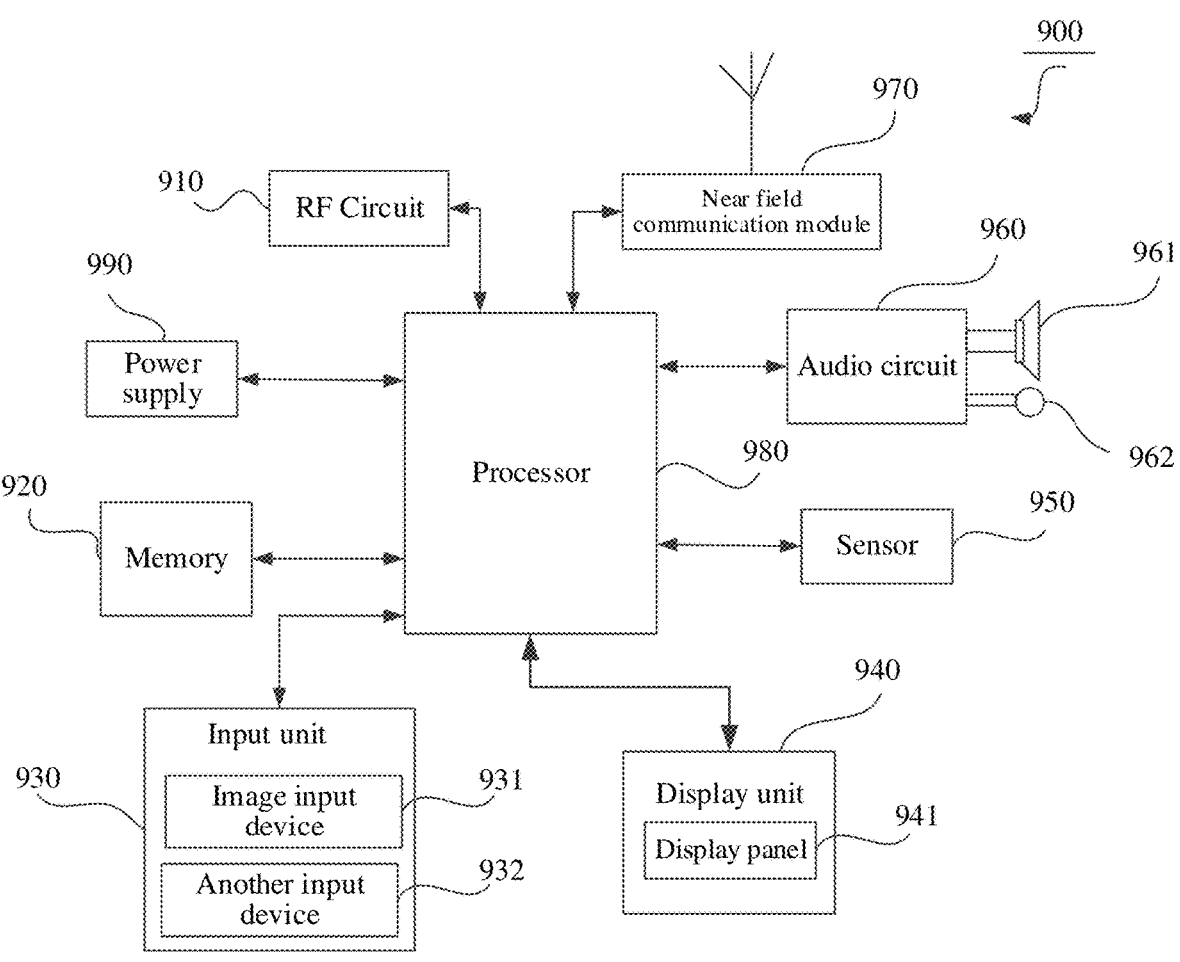

FIG. 9 is a schematic structural diagram of a data storage apparatus according to an embodiment of the present disclosure.

DESCRIPTION OF EMBODIMENTS

To make the objectives, technical solutions, and advantages of embodiments of the present disclosure more comprehensible, the following clearly and completely describes the technical solutions in the embodiments of the present disclosure with reference to the accompanying drawings in the embodiments of the present disclosure.

Some terms in the embodiments of the present disclosure are explained below to facilitate understanding by a person skilled in the art.

(1) B+ Tree:

The B+ tree is a tree-like data structure, usually used in a database and a file system of an operating system. A characteristic of the B+ tree is that data can be maintained stably and orderly, and insertion and modification in the B+ tree have stable logarithmic time complexity.

(2) Trie Tree:

The trie tree is an ordered tree, configured to store an associative array, a key in the trie tree is usually a character string. Unlike a binary search tree, the key is not stored directly in a node, but is determined by a position of the node in the tree. All descendant nodes of a node have the same prefix, that is, a character string corresponding to the node (namely, an identifier of a node, which may also be referred to as a key of a node). Generally, not all nodes have corresponding values, and only keys corresponding to a leaf node and some internal nodes have related values.

(3) Compare-and-Swap (CAS):

Compare-and-swap is an atomic operation, and can be used to implement an uninterrupted data exchange operation in multithreading programming, to avoid data inconsistency caused by uncertainty of an execution sequence and unpredictability of interruption when specific data is simultaneously rewritten in multiple threads.

(4) Online Transaction Processing (OLTP):

A basic feature of the OLTP is that operation data received by a client can be immediately transmitted to a computing center for processing, and a processing result is given in a short time, which is one of manners of quickly responding to the operation.

(5) Online Analysis Processing (OLAP):

The OLAP is a software technology that enables a data analyst to quickly, consistently, and interactively observe information from various aspects, to deeply understand data.

The embodiments of the present disclosure relate to the field of cloud computing, and may be applied to the fields such as smart transportation, smart agriculture, smart medicine, or maps.

The cloud computing is a mode of delivery and use of IT infrastructure, and is obtaining required resources in an on-demand and easily scalable manner through a network. The cloud computing in a broad sense is a mode of delivery and use of services, and is obtaining required services in an on-demand and easily scalable manner through a network. The services may be related to IT, software, and the Internet, or may be other services. The cloud computing is a product of fusion and the development of conventional computers and network technologies such as grid computing, distributed computing, parallel computing, utility computing, network storage technologies, virtualization, and load balancing.

With diversified development of the Internet, real-time data flows, and connected devices, and driving of requirements for search services, social networks, mobile commerce, open collaboration, and the like, the cloud computing develops rapidly. Unlike previous parallel distributed computing, generation of the cloud computing drives revolutionizing of an entire Internet mode and an enterprise management mode from ideas.

In the embodiments of the present disclosure, relevant data such as to-be-stored data are involved. When the foregoing embodiments of the present disclosure are applied to specific products or technologies, user permission or consent needs to be obtained, and collection, use, and processing of relevant data need to comply with relevant laws, regulations, and standards of relevant countries and regions.

An application field of the data storage method provided in the embodiments of the present disclosure is briefly described below.

With continuous development of science and technology, more and more devices can store to-be-stored data of a graph structure into a memory, and further store data in the memory into a disk, so that corresponding target data can be queried and read from the stored data when the target data is to be used.

In the related art, a data storage method for to-be-stored data of a graph structure is to use, in a form of a key-value pair, each vertex identifier included in the to-be-stored data of the graph structure as a key, and use attribute information of each vertex as a value of a corresponding key for storage. Similarly, in the form of the key-value pair, a start vertex of each edge is used as a key, and respective attribute information of each edge is used as a value of a corresponding key for storage.

However, in the related art, no association exists between storage of data of each vertex and storage of data of the edges included in the data of the graph structure (for example, data of different edges of the same vertex is stored on different disks). Only separate storage (namely, unassociative storage) of the vertex and the edge in the data of the graph structure is implemented, and local properties of the graph structure are not presented in the stored data (for example, associativity between the data of the vertex and the data of the edge is not presented). In this way, when a large volume of to-be-stored data exists, storage states of data in a memory and a disk are chaotic. In other words, flexibility of a data storage process is low. Based on this, when target data is queried or inserted, a large number of input/output (I/O) operations need to be performed, so that access efficiency is low.

Referring to FIG. 1A (1), due to a local property of the graph structure, each vertex and an edge connected to the vertex can be clearly displayed. For example, that a vertex of a person name A has an edge of a father-son relationship, and attribute information in edge data of the edge are displayed. That the vertex further has an edge of an uncle-nephew relationship, and attribute information in edge data of the edge are displayed. That the vertex further has an edge of a neighbor relationship, and attribute information in edge data of the edge are displayed. Edge data of an edge includes index information and attribute information. The index information is, for example, an identifier of the edge.

However, in FIG. 1A (2), the content presented in FIG. 1A (1) cannot be intuitively displayed. To query an edge connected to the vertex of the person name A, three I/O operations need to be performed. One I/O operation is configured for querying the edge of the father-son relationship of the person name A and the attribute information in the edge data of the edge; one I/O operation is configured for querying the edge of the uncle-nephew relationship of the person name A and the attribute information of the edge data of the edge; and one I/O operation is configured for querying the neighbor relationship edge of the person name A and the attribute information in the edge data of the edge.

In the related art, efficiency of data access for the to-be-stored data of the graph structure is relatively low.

To resolve the problem of the low efficiency of the data access for the to-be-stored data of the graph structure, the present disclosure provides a data storage method. In the method, after to-be-stored data of a graph structure is obtained, data of a root node and data of at least one first subnode (or first-subnode) associated with the root node are generated in a memory based on index information in vertex data of each vertex, data of at least one second subnode (or second-subnode) associated with each first subnode is generated based on attribute information in the vertex data of the vertex, and data of at least one third subnode (or third-subnode) associated with each second subnode is generated based on index information in edge data of edges and attribute information in the edge data of the edges, to obtain memory data of a tree structure. A plurality of disk blocks are established in a disk based on the memory data, and the data of the root node, the data of each first subnode, and data of a subtree using each second subnode as a root node are respectively stored into corresponding disk blocks, to obtain disk data of the tree structure. The data of the graph structure includes vertex data of at least one vertex of the graph structure and edge data of at least one edge of the graph structure.

In the embodiments of the present disclosure, the memory data of the tree structure is used for storing the to-be-stored data of the graph structure in the memory, and the disk data of the tree structure is used for storing the to-be-stored data of the graph structure in the disk. Compared with the method in which the to-be-stored data of the graph structure is stored in the form of the key-value pair, the tree structure may represent associativity between data to some extent, thereby reflecting the local property of the data of the graph structure (that is, reflecting associativity between the data of the vertex and the data of the edge), to improve the efficiency of the data access.

Further, in the memory, the index information in the vertex data of the vertex may be associated with the attribute information in the vertex data of a corresponding vertex, and then associated with the index information and the attribute information in the edge data of the edge connected to the corresponding vertex, so that data of each vertex and data of the edge connected to the vertex in the graph structure may be stored at an associated position in the memory. Compared with a random storage method or a method in which each vertex and an edge connected to the vertex are scattered at unassociated storage positions, a number of I/O operations can be reduced during the data access, thereby improving the efficiency of the data access, that is, improving efficiency of inserting data and querying data. For example, when data of a plurality of edges of a vertex is read, in the embodiments of the present disclosure, when index information corresponding to the vertex (that is, the first subnode at which the index information of the vertex is located) is queried, a second subnode and a third subnode corresponding to the vertex may be queried through the index information, to query data of a plurality of edges of the vertex that is stored in association. This is more efficient than querying by traversing a plurality of records (each record including data of one edge) at a plurality of storage positions (for example, a manner shown in FIG. 1A (2)).

Since a preset storage space of each node in the memory is relatively fixed in size, the first subnode does not store the attribute information, and only the index information in the vertex data of the vertex is stored. The index information in the vertex data of the vertex may be stored as much as possible in each first subnode, so that an order of a formed tree structure is relatively large. In this way, during data search, more vertexes may be queried in a single first subnode, thereby reducing a number of to-be-accessed first subnodes (one I/O operation is required for accessing each first byte), thereby reducing the I/O operations, to improve data search efficiency.

Further, in a disk, data of each vertex and data of a subtree formed by an edge connected to the vertex may be serialized in the same physical space (for example, the same disk). Compared with a manner of randomly storing data of each vertex and data of an edge connected to the vertex (that is, a manner in which the data of each vertex and the data of the edge connected to the vertex may be scattered into a plurality of disks), the efficiency of data access is improved. The data of the subtree formed by the data of each vertex and the data of the edge connected to the vertex may be serialized in the same physical space (for example, the same disk). In the embodiments of the present disclosure, data related to the same vertex may be sequentially written in the same disk. In this way, during data search, sequential read may be implemented, thereby reducing a number of the I/O operations, to improve data search efficiency.

An application scenario of the data storage method provided in the present disclosure is described below.

Figure 1B:
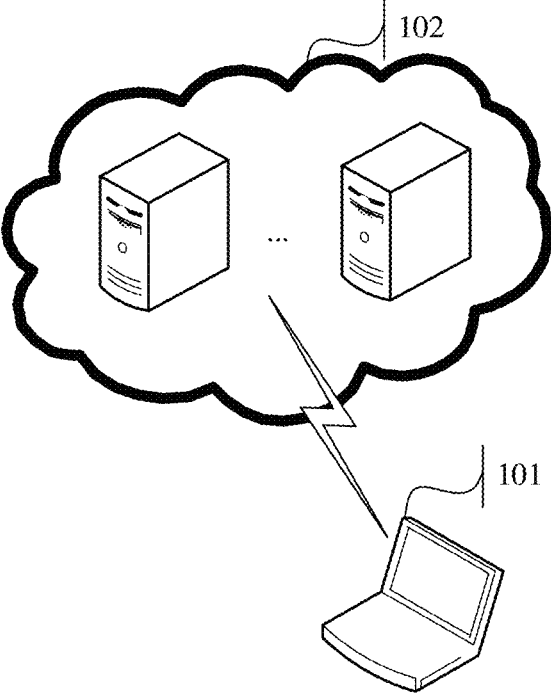
FIG. 1B shows an application scenario of a data storage method according to an embodiment of the present disclosure.

FIG. 1B is a schematic diagram of an application scenario of a data storage method according to the present disclosure. The application scenario includes a client 101 and a server side 102. The client 101 and the server side 102 may communicate with each other. Communication may be performed by using a wired communication technology, for example, communication by connecting a network cable or a serial cable; or the communication may be performed by using a wireless communication technology, for example, communication may be performed by using a technology such as Bluetooth or wireless fidelity (Wi-Fi), which is not specifically limited.

The client 101 generally refers to a device that can provide, for example, to-be-stored data of a graph structure to the server side 102. A terminal device includes, but is not limited to, a mobile phone, a computer, a smart medical device, a smart home appliance, an in-vehicle terminal, an aircraft, or the like. The server side 102 generally refers to a device that can store data, for example, a terminal device or a server. The server includes, but is not limited to, a cloud server, a local server, an associated third party server, or the like. Both the client 101 and the server side 102 may use cloud computing, to reduce occupation of local computing resources; or may use cloud storage, to reduce occupation of the local storage resources.

In an embodiment, the client 101 and the server side 102 may be the same device, which is not specifically limited. In the embodiments of the present disclosure, an example in which the client 101 and the server side 102 are different devices is used for description.

The data storage method provided in the embodiments of the present disclosure, performed by the server is specifically described below based on FIG. 1B. FIG. 2 is a schematic flowchart of a data storage method according to an embodiment of the present disclosure. The method is performed, for example, by/in a computer device such as the server side 102.

S201. Obtain data of a graph structure. The data of the graph structure includes vertex data of at least one vertex of the graph structure and edge data of at least one edge of the graph structure. The vertex data may include index information configured for identifying a vertex and attribute information configured for representing data content of a vertex. The edge data includes index information for identifying an edge and attribute information representing an association relationship between two vertexes connected by a corresponding edge.

In an embodiment, the graph structure may be a structure such as a directed graph or an undirected graph. Attribute information of vertex data of each vertex in the graph structure is an attribute object that has an association relationship, and attribute information of edge data represents an association relationship between vertexes. The data of the graph structure may represent, for example, a social relationship between persons, a logical relationship between functions in code, a road clearing relationship between places, an execution relationship between blocks in a blockchain, a communication relationship between devices, or the like, which is not specifically limited.

Figure 3:
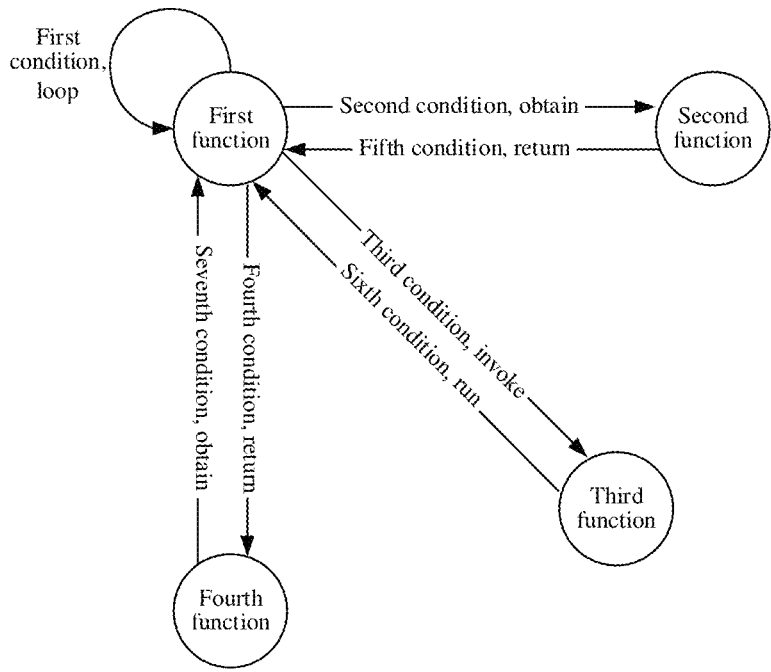
FIG. 3 shows to-be-stored data of a graph structure in a data storage method according to an embodiment of the present disclosure.

Using to-be-stored data of a graph structure representing a logical relationship of functions in code as an example below, FIG. 3 shows to-be-stored data of a graph structure, including data of four vertexes, which are a first function, a second function, a third function, and a fourth function. Attribute information of each function is a functional description of the function, and the like (not shown in the figure).

The to-be-stored data of the graph structure further includes edge data of seven edges, and the edge data of each edge has corresponding attribute information. For example, the first function executes loop logic when a first condition is satisfied; the first function executes obtaining logic of obtaining an execution result of the second function when a second condition is satisfied; the first function executes invocation logic of invoking the third function when a third condition is satisfied; the first function executes return logic of returning an execution result to the fourth function when a fourth condition is satisfied; the second function executes return logic of returning an execution result when a fifth condition is satisfied; the third function executes operation logic of the third function when a sixth condition is satisfied; and the fourth function executes obtaining logic of transmitting obtaining of an execution result to the first function when a seventh condition is satisfied.

The to-be-stored data of the graph structure may be obtained at the client in response to an input operation for the data of the graph structure, and the to-be-stored data of the graph structure is obtained based on the input operation responded by the client. In the input operation responded by the client for the data, the data may alternatively be of any structure. In this way, the client may generate the to-be-stored data of the graph structure according to the obtained input data, so that the to-be-stored data of the graph structure can be obtained by receiving the to-be-stored data of the graph structure sent by the client.

The to-be-stored data of the graph structure obtained by the client may be dynamically adjusted in real time or periodically according to the input operation. In this way, receiving of the to-be-stored data of the graph structure sent by the client is also dynamically adjusted in real time or periodically. For example, after obtaining the to-be-stored data of the graph structure including the first function, the third function, and the edges between the first function and the third function through the first input operation, the client transmits the to-be-stored data of the graph structure including the first function, the third function, and the edges between the first function and the third function to the server. The client continues to obtain, in response to a second input operation for the second function, to-be-stored data of the graph structure including the first function, the third function, and the edges between the first function and the third function, and including the first function, the second function, and the edges between the first function and the second function. The edge data including the first function, the third function, and the edges between the first function and the third function, and including the to-be-stored data of the graph structure including the first function, the second function, and the edges between the first function and the second function continues to be transmitted to the server, to update the to-be-stored data of the graph structure transmitted last time, and the like. This is not specifically limited.

S202. Establish memory data of a tree structure for the data of the graph structure in a memory. In some implementations, S202 may include constructing memory data of a tree structure for the data of the graph structure in a memory of the computer device.

Specifically, the operation includes: generating, in the memory based on index information in vertex data of each vertex in the data of the graph structure, data of a root node of the tree structure and data of at least one first subnode associated with the root node, the data of the root node indicating a storage position of the data of the at least one first subnode in the memory, and data of each first subnode including index information in vertex data of at least one vertex; generating, based on attribute information in the vertex data of the vertex, data of at least one second subnode associated with each first subnode, data of each second subnode including attribute information in vertex data of a corresponding vertex; and generating, based on index information in edge data of each edge and attribute information in the edge data of the edge in the data of the graph structure, data of at least one third subnode associated with each second subnode, data of each third subnode including attribute information and index information in edge data of at least one edge.

For example, FIG. 4A shows a tree structure object. In the tree structure object (namely, the tree structure corresponding to the memory data), the root node is associated with three first subnodes, which are a first subnode A, a first subnode B, and a first subnode C. Each first subnode is associated with two second subnodes. To be specific, the first subnode A is associated with a second subnode A and a second subnode B; the first subnode B is associated with a second subnode C and a second subnode D; and the first subnode C is associated with a second subnode E and a second subnode F.

Each second subnode is associated with two third subnodes. To be specific, the second subnode A is associated with a third subnode A and a third subnode B; the second subnode B is associated with a third subnode C and a third subnode D; the second subnode C is associated with a third subnode E and a third subnode F; the second subnode D is associated with a third subnode G and a third subnode H; the second subnode E is associated with a third subnode I and a third subnode J; and the second subnode F is associated with a third subnode K and a third subnode L.

Because the first subnode stores only the index information in the vertex data of the vertex and does not store the attribute information in the vertex data of the vertex, and the index information in the vertex data of the vertex occupies a small storage space and the attribute information in the vertex data of the vertex occupies a large storage space, each first subnode may store index information in the vertex data of a larger number of vertexes. Therefore, when data of a target vertex is searched for, only one memory I/O operation is required, and index information in vertex data corresponding to the target vertex may be found from index information in vertex data of a large number of vertexes, thereby reducing the number of I/O operations and improving data query efficiency.

The at least one second subnode associated with each first subnode stores the attribute information in the vertex data of the vertex. The data of each second subnode may include attribute information in the vertex data of one vertex. Based on the memory data of the tree structure formed by the data of each first subnode and the data of each second subnode, when the data of one vertex is searched for, in this embodiment of the present disclosure, the attribute information in the vertex data of the target vertex may be found from the attribute information in the vertex data of the plurality of vertexes through only two I/O operations (to be specific, an I/O operation of querying the index information in the vertex data of the vertex (that is, the first I/O operation) and an I/O operation of querying the attribute information in the vertex data of the vertex based on the index information in the vertex data of the vertex (that is, the second I/O operation)). Compared with a tree structure such as a binary tree, flexibility of data storage is high in this manner, and the number of I/O operations required for querying target data is smaller, so that query efficiency is higher.

The at least one third subnode associated with each second subnode is equivalent to having the same prefix (that is, index information of the second subnode). In this way, an edge corresponding to the at least one third subnode is an edge connected to a vertex corresponding to the corresponding second subnode, so that the data of the vertex and the data of the edge associated with the vertex in the memory data of the generated tree structure are stored in association (that is, stored in the same storage area). Therefore, when the target data is queried, the data query efficiency can be improved.

In the memory data of the tree structure, by using the second subnode as the subtree of the root node, local properties of the to-be-stored data of the graph structure can be intuitively and accurately represented. The local properties include a spatial local property and a time local property. In this way, when data query or data analysis is performed based on the memory data of the tree structure, lower computing performance is consumed. In other words, by generating the data of a subtree in the memory, efficiency of the data access (for example, querying or writing) in the memory can be improved, computing resources of the computer device can be saved, and power consumption can be reduced.

Since a preset storage space of each node in the memory is relatively fixed in size, the first subnode does not store the attribute information, and only the index information in the vertex data of the vertex is stored. The index information in the vertex data of the vertex may be stored as much as possible in each first subnode, so that an order of a formed tree structure is relatively large. In this way, during data search, more vertexes may be queried in a single first subnode, thereby reducing a number of to-be-accessed first subnodes (one I/O operation is required for accessing each first byte), thereby reducing the I/O operations, to improve data search efficiency.

Further, data of a subtree (that is, a tree using the second subnode as a root node) formed by each vertex and an edge connected to the vertex may be stored in the same storage area. The data query efficiency is improved compared with the manner of randomly storing data of each vertex and data of an edge connected to the vertex (that is, the manner in which the data of each vertex and the data of the edge connected to the vertex may be scattered into a plurality of storage areas).

In an embodiment, to generate, in the memory, the data of the root node of the tree structure and the data of the at least one first subnode associated with the root node, in this embodiment of the present disclosure, the index information in vertex data of each vertex may be divided into at least one vertex index information group. Each vertex index information group includes index information in vertex data of at least one vertex. Based on the at least one vertex index information group, the data of the root node of the tree structure and the data of the at least one first subnode associated with the root node are generated in the memory, the data of each first subnode including one corresponding vertex index information group. In this way, in this embodiment of the present disclosure, one or more pieces of index information may be included in the first subnode. When a plurality of pieces of index information are included, in this embodiment of the present disclosure, more index information can be queried through a single I/O operation, thereby reducing a quantity of the first subnode to be visited and reducing a number of the I/O operations, to improve the data query efficiency.

In an embodiment, when the data of the at least one first subnode associated with the root node is generated in the memory based on the index information in the vertex data of the vertex, a quantity of generated first subnodes and index information included in the data of each first subnode may be determined by a size of a storage space occupied by the index information of each vertex.

In an embodiment, to obtain the vertex index information groups through division, in this embodiment of the present disclosure, a data volume of the index information in the vertex data of the vertex may be obtained; and the index information in the vertex data of the vertex is divided into the at least one vertex index information group based on the data volume of the index information in the vertex data of the vertex and a preset storage volume for the data of the first subnode, each vertex index information group including index information in vertex data of at least one vertex.

In an embodiment, the first subnode may be associated with a preset storage volume, configured for representing a maximum storage space size of the first subnode. Then, after the data volume (namely, a size of an occupied storage space) of the index information of the vertex is determined, the index information in the vertex data of the vertex may be divided into at least one vertex index information group. For example, a ratio of the preset storage volume of the first subnode to the data volume of a single piece of index information is calculated, and an integer part (for example, rounding down) of the ratio is used as a quantity of vertexes in a single vertex index information group. Alternatively, the integer part of the ratio is used as an upper limit of the quantity of vertexes in the single vertex index information group. In this embodiment of the present disclosure, a ratio of the total quantity of vertexes corresponding to the data of the graph structure to the upper limit of the quantity of vertexes may be rounded up, to obtain a total quantity N of the vertex index information groups. Based on this, in this embodiment of the present disclosure, the index information corresponding to the vertex may be evenly allocated to the total quantity N of vertex index information groups. Alternatively, in this embodiment of the present disclosure, index information may be allocated to N−1 vertex index information groups according to the upper limit of the quantity of vertexes, and the remaining index information is allocated to the remaining one vertex index information group.

For example, if the preset storage volume associated with the first subnode is 4 KB and a storage occupation volume of data of each vertex is 4 B, one first subnode may store index information in vertex data of 1024 vertexes at most. If the to-be-stored data of the graph structure includes 3000 vertexes, index information in vertex data of 3000 vertexes may be divided into three vertex index information groups. The index information may be divided evenly. To be specific, the three vertex index information groups each include index information in vertex data of 1000 vertexes. The index information may alternatively be divided according to a maximum storage volume. To be specific, two vertex index information groups each include 1024 vertexes, and another vertex index information group includes index information in the vertex data of 952 vertexes. This is not specifically limited. Therefore, the three first subnodes may be correspondingly generated according to the three vertex index information groups. Referring to FIG. 4B, an example in which the three vertex index information groups each include the index information in the vertex data of the 1000 vertexes is used, the three generated first subnodes each include the index information in the vertex data of the 1000 vertexes.

In an embodiment, the root node may be used only as a start of the tree structure, and does not store any vertex data or edge data, but indicates the storage positions of the first subnodes by pointers. That is, the data of the root node includes pointers indicating the storage positions of the first subnodes. Then, when the data of the at least one first subnode associated with the root node is generated in the memory based on the obtained at least one vertex index information group, after the root node is established in the memory, at least one root node pointer may be set for the root node based on a group quantity of the obtained at least one vertex index information group, as the data of the root node. Each root node pointer is configured for indicating a storage position of data of one first subnode associated with the root node in the memory. The at least one vertex index information group is respectively stored into a storage position indicated by a corresponding root node pointer, to obtain the at least one first subnode associated with the root node.

For example, a group quantity of the obtained at least one vertex index information group is 3, including a vertex index information group A, a vertex index information group B, and a vertex index information group C. Then, referring to FIG. 4C, three root node pointers may be set for the root node, which are a first root node pointer, a second root node pointer, and a third root node pointer. That is, the data of the root node includes three root node pointers. The first root node pointer is configured for indicating a storage position A of the first subnode A, the second root node pointer is configured for indicating a storage position B of the first subnode B, and the third root node pointer is configured for indicating a storage position C of the first subnode C. The vertex index information group A is stored into the storage position A indicated by the first root node pointer, that is, the first subnode A is obtained; the vertex index information group B is stored into the storage position B indicated by the second root node pointer, that is, the first subnode B is obtained; and the vertex index information group C is stored into the storage position C indicated by the third root node pointer, that is, the first subnode C is obtained.

The storage position indicated by each root node pointer may be determined according to a storage position in an idle state in the memory. For example, FIG. 4D shows a memory in a stack form, including a storage position A, a storage position B, . . . , and a storage position N. If the storage position B is in an idle state, the root node pointer may indicate the storage position B, and the storage position B may be configured to store the corresponding first subnode.

The storage position indicated by each root node pointer may alternatively be selected from the memory based on the preset storage volume associated with the first subnode, or the like, which is not specifically limited.

In an embodiment, when the data of the at least one second subnode associated with each first subnode is generated based on the attribute information in the vertex data of the vertex, the first subnode may alternatively indicate, by using a pointer, a storage position of each of the at least one second subnode associated with the first subnode. One first subnode is used as an example below for description. Processes of generating at least one second subnode associated to each first subnode are similar. Details are not described herein.

At least one first node pointer is set for the first subnode based on a quantity of vertexes corresponding to the index information in the vertex data of the at least one vertex included in the first subnode. Specifically, one first node pointer is allocated to each piece of index information in the vertex data of one first subnode. Each first node pointer is associated with index information in vertex data of one vertex included in the first subnode, and each first node pointer is configured for indicating a storage position of one second subnode associated with the first subnode. The attribute information in the vertex data of the at least one vertex indicated by the data of the first subnode is respectively stored into a storage position indicated by a corresponding first node pointer, to obtain data of at least one second subnode associated with the first subnode.

For example, when the first subnode includes the index information in the vertex data of two vertexes, which is index information of a vertex A and a vertex B, and the quantity of vertexes is 2, the first subnode is associated with two second subnodes, which are a second subnode A and a second subnode B.

Referring to FIG. 4E, two first node pointers, which are a first node pointer A and a first node pointer B, are set for the first subnode. The first node pointer A is associated with the vertex A, and is configured for indicating a storage position A of the second subnode A; and the first node pointer B is associated with the vertex B, and is configured for indicating a storage position B of the second subnode B. Attribute information of the vertex A is stored into the storage position A indicated by the first node pointer A, that is, the second subnode A is obtained; and attribute information of the vertex B is stored into the storage position B indicated by the first node pointer B, that is, the second subnode B is obtained.

The storage position indicated by each first node pointer may also be determined according to a storage position in an idle state in the memory. In addition, a preset storage volume may alternatively be set for the second subnode in association. The storage position indicated by each first node pointer may be selected from the memory based on the preset storage volume associated with the second subnode, or the like. This is not specifically limited.

In an embodiment, when the attribute information in the vertex data of the at least one vertex indicated by the first subnode is respectively stored in the storage position indicated by the corresponding first node pointer, and the data of the at least one second subnode associated with the first subnode is obtained, statistical information of the edge connected to the corresponding vertex may be further stored into each storage position. The statistical information may be counting a quantity of edges connected to the corresponding vertex, or may be counting a quantity of edges of different edge categories connected to the corresponding vertex, or the like, which is not specifically limited. The edge category may be an outgoing edge or an incoming edge. An outgoing edge of a vertex is an edge using the vertex as a start point, and an incoming edge of a vertex is an edge using the vertex as an end point. The edge category may alternatively be set according to a specific usage scenario. For example, when a different edge at a vertex may represent a trigger method and abnormal performance of an abnormal condition, the trigger method and the abnormal performance may be each used as an edge category.

One vertex indicated by one first subnode is used as an example below for description. Processes of storing statistical information of an edge connected to each vertex are similar. Details are not described herein.

Based on a plurality of preset edge categories, in edges connected to the vertex, an edge quantity of edges belonging to each edge category is counted. The attribute information in the vertex data of the vertex and the counted edge quantity of the edges of each edge category are stored into a storage position indicated by the first node pointer corresponding to the vertex, to obtain data of one second subnode associated with the first subnode.

For example, the edge category includes the outgoing edge and the incoming edge. Based on the to-be-stored data of the graph structure shown in FIG. 3, when the memory data of the tree structure is obtained, referring to FIG. 4F, if data of a first subnode includes index information of a first function and index information of a second function, the first subnode may be associated with a second subnode A through a storage position A indicated by a first node pointer A corresponding to the first function; and the second subnode B may be further associated with a storage position B indicated by a first node pointer B corresponding to the second function.

The edges connected to the first function are counted, where an edge quantity of the outgoing edges is 4, and an edge quantity of the incoming edges is 4; and the edges connected to the second function are counted, where an edge quantity of the outgoing edges is 1, and an edge quantity of the incoming edges is 1. Attribute information of the first function, and the edge quantity 4 of the outgoing edges and the edge quantity 4 of the incoming edges are stored into the storage position A, to obtain the second subnode A; and attribute information of the second function, and the edge quantity 1 of the outgoing edges and the edge quantity 1 of the incoming edges are stored into the storage position B, to obtain data of the second subnode B.

In an embodiment, for each of at least one edge category, a second node pointer associated with the edge category may be set in the second subnode. Each second node pointer corresponds to one edge category, and is configured for indicating a storage position of data of one third subnode associated with the second subnode.

One second subnode is used as an example below for description. Processes of obtaining at least one third subnode associated with each second subnode are similar. Details are not described herein.

At least one second node pointer is set for the second subnode based on at least one edge category included in the vertex in the second subnode. For example, a second node pointer is allocated to each edge category. In edges connected to the vertex included in the second subnode, edges corresponding to the at least one edge category are respectively determined. The index information and the attribute information in the edge data of the edge corresponding to each of the at least one edge category are stored into the storage position indicated by the corresponding second node pointer, to obtain the data of the at least one third subnode associated with the second subnode.

For example, still based on the to-be-stored data of the graph structure shown in FIG. 3, when the memory data of the tree structure is obtained, if one second subnode includes the attribute information of the first function, and the edge quantity of outgoing edges and the edge quantity of incoming edges in the edges connected to the first function, that is, two edge quantities, the second subnode is associated with two third subnodes, which are the third subnode A and the third subnode B.

Referring to FIG. 4G, two second node pointers, which are a second node pointer A and a second node pointer B, are set for the second subnode. The second node pointer A is associated with an edge quantity of outgoing edges, and is configured for indicating a storage position A of the third subnode A; and the second node pointer B is associated with an edge quantity of incoming edges, and is configured for indicating a storage position B of the third subnode B.

It is determined that the edges corresponding to the edge quantity of outgoing edges include: a first edge, where attribute information in edge data of the edge is "First condition, loop"; a second edge, where attribute information in edge data of the edge is "Second condition, obtain"; a third edge, where attribute information in edge data of the edge is "Third condition, invoke"; and a fourth edge, where attribute information in edge data of the edge is "Fourth condition, return". It is determined that the edges corresponding to the edge quantity of incoming edges include: a fifth edge, where attribute information in edge data of the edge is "Fifth condition, return"; a sixth edge, where attribute information in edge data of the edge is "Sixth condition, run"; a seventh edge, where attribute information in edge data of the edge is "Seventh condition, obtain"; and an eighth edge, where attribute information in edge data of the edge is "First condition, loop".

In this way, index information and the attribute information in the edge data of the edges corresponding to the edge quantity of the outgoing edges are stored into the storage position A, to obtain the third subnode A; and index information and the attribute information in the edge data of the edges corresponding to the edge quantity of the incoming edges are stored into the storage position B, to obtain the third subnode B.

S203. Establish a plurality of disk blocks in a disk based on the memory data, and store the root node, each first subnode, and a subtree using each second subnode as a root node into corresponding disk blocks respectively, to obtain disk data of the tree structure. In the present disclosure, a disk may refer to a hard disk and/or a data storage device (which may include one or more hard disk or may be a cloud-based data storage), In some implementations, S203 may include a portion or all of the following: constructing a plurality of disk blocks in a storage device based on the memory data of the tree structure; and storing the data of the root node, the data of each first-subnode, and data of a subtree using each second-subnode as a root node into corresponding disk blocks respectively, to obtain the storage data of the tree structure for the graph structure In an embodiment, after the memory data is obtained, a plurality of disk blocks with adjacent logical addresses may be established in the disk based on the memory data, and the data of the root node, the data of each first subnode, and the data of the subtree using each second subnode as the root node are respectively stored in the corresponding disk blocks, to obtain the disk data of the tree structure.

For example, based on the memory data of the tree structure shown in FIG. 4A, FIG. 5A shows disk data of a tree structure obtained based on the memory data, including 10 disk blocks with adjacent logical addresses, which are a first disk block, a second disk block, a third disk block, a fourth disk block, a fifth disk block, a sixth disk block, a seventh disk block, an eighth disk block, a ninth disk block, and a tenth disk block.

The plurality of disk blocks with adjacent logical addresses may be that the first disk block stores an offset address of the second disk block, so that jumping may be performed directly from the first disk block to the second disk block, and so on. In other words, one of the two disk blocks with adjacent logical addresses stores an offset address of the other disk block. For example, FIG. 5B shows a disk 500. An annular shape in the disk 500 is a magnetic track. For example, an annular shape with a dotted background is a magnetic track 501. A magnetic track may be divided into a plurality of sectors. For example, a part of the annular shape with a striped background is a sector 502. One disk block may include a plurality of sectors. A physical address of a disk block to which data is first written is used as a base address, and other disk blocks may be represented by offsets of the physical addresses of the other disk blocks relative to the base address, that is, represented by offset addresses.

The first disk block is configured to store the root node in the memory data. The second disk block is configured to store the first subnode A, the third disk block is configured to store the first subnode B, and the fourth disk block is configured to store the first subnode C. The fifth disk block is configured to store a subtree using the second subnode A as a root node, including the second subnode A, the third subnode A, and the third subnode B. The sixth disk block is configured to store a subtree using the second subnode B as a root node, including the second subnode B, the third subnode C, and the third subnode D. The seventh disk block is configured to store a subtree using the second subnode C as a root node, including the second subnode C, the third subnode E, and the third subnode F. The eighth disk block is configured to store a subtree using the second subnode D as a root node, including the second subnode D, the third subnode G, and the third subnode H. The ninth disk block is configured to store a subtree using the second subnode E as a root node, including the second subnode E, the third subnode I, and the third subnode J. The tenth disk block is configured to store a subtree using the second subnode F as a root node, including the second subnode F, the third subnode K, and the third subnode L.

In the method for obtaining disk data of a tree structure in this embodiment of the present disclosure, logical addresses of a plurality of disk blocks are adjacent, so that a computer device can perform a sequential read/write process on a disk. Compared with a random read/write method (that is, random allocation of disk blocks), fewer I/O operations are required for querying target data, and the query efficiency is higher. In addition, the data of the subtrees using the second subnode as the root node is stored in the same disk block, so that a local property of data storage of the graph structure can be fully represented, thereby causing the data storage to be more flexible, improving efficiency of querying data in the subtree in the same disk block or disk blocks with adjacent logical addresses, and further improving data processing efficiency of the device.

In an embodiment, when the plurality of disk blocks with adjacent logical addresses are established in the disk based on the memory data, a root node disk block corresponding to the root node may be first established based on a size of a storage space occupied by the data of the root node, and based on a quantity of the first subnodes, at least one root node offset address is set for the root node disk block. Each root node offset address is configured for indicating a physical address of a disk block adjacent to a logical address of the root node disk block. In short, a disk block is established for each first subnode.

A first node disk block corresponding to the corresponding first subnode is established based on the size of the storage space occupied by the data of the first subnode and a corresponding root node offset address, and based on a quantity of second subnodes associated with each first subnode, at least one first node offset address is set for the corresponding first node disk block. Each first node offset address is configured for indicating a physical address of a disk block adjacent to a logical address of the first node disk block.

Finally, based on a size of a storage space occupied by the data of the subtree using the second subnode as the root node, a subtree disk block corresponding to the corresponding subtree is established according to the corresponding first node offset address, to obtain a plurality of disk blocks with adjacent logical addresses.

For example, based on the structure shown in FIG. 4C, the root node is associated with the first subnode A, the first subnode B, and the first subnode C. In this way, referring to FIG. 5C, the root node disk block corresponding to the root node may be first established. Since the root node is associated with three first subnodes, three root node offset addresses are set for the root node disk block, which are a root node offset address A, a root node offset address B, and a root node offset address C. The root node offset address A is configured for indicating a physical address A of a first node disk block A that stores the first subnode A, the root node offset address B is configured for indicating a physical address B of a first node disk block B that stores the first subnode B, and the root node offset address C is configured for indicating a physical address C of a first node disk block C that stores the first subnode C.

For example, based on the structure shown in FIG. 4E, one first subnode is used as an example. The first subnode is associated with the second subnode A and the second subnode B. In this way, referring to FIG. 5D, two first node offset addresses, which are a first node offset address A and a first node offset address B, may be set for a first node disk block corresponding to the first subnode. The first node offset address A is configured for indicating to store a physical address A of a subtree disk block A of a subtree A using the second subnode A as a root node; and the first node offset address B is configured for indicating to store a physical address B of a subtree disk block B of a subtree B using the second subnode B as a root node.

In an embodiment, when the subtree disk block corresponding to the corresponding subtree is established, the size of the storage space occupied by the data of the subtree may be excessively large and exceed a preset maximum storage space amount of the disk block, and it is possible that a corresponding subtree disk block cannot be established for the excessively large subtree.

Therefore, when it is determined that the size of the storage space occupied by the subtree is greater than the preset maximum storage space amount, the subtree is split according to the maximum storage space amount, to obtain a plurality of to-be-stored nodes. A plurality of second node offset addresses are generated, using a corresponding first node offset address as a starting address, based on a quantity of the plurality of to-be-stored nodes. Based on a traversing order of the subtree, second node disk blocks respectively corresponding to the plurality of to-be-stored nodes are established according to the plurality of second node offset addresses. Based on the traversing order of the subtree, a second node offset address of a next second node disk block that is to be traversed is set for each established second node disk block. Therefore, the plurality of established second node disk blocks may be accessed sequentially in the traversing order, thereby improving convenience of data access. Therefore, when the data query is performed for the subtree, no additional I/O operation needs to be performed (for example, if the data in the subtree is randomly stored into a plurality of physical addresses, a plurality of I/O operations need to be performed for the plurality of physical addresses), and corresponding data can be queried, thereby improving the query efficiency.

For the edge data of the edge stored in the subtree similar to the trie tree, data of the same subtree is serialized to the same physical address as much as possible, thereby ensuring that the same vertex and all edges of the vertex can be stored in a physical space of the same disk block (or adjacent disk blocks) on the disk. For a vertex with a large number of edges (such as a super hotspot), the edges of the vertex are divided into different disk blocks in a paging manner, and the disk blocks are organized in a form of a linked list, to form disk blocks with adjacent logical addresses. Therefore, when the disk data is queried and analyzed, an advantage that sequential read or write performance of the disk is higher than random read/write performance may be fully utilized, to change the I/O operation on the disk into a sequential I/O operation, thereby speeding up the query.

For example, for the memory data, referring to FIG. 5E (1), a first subnode is associated with a second subnode, and the second subnode is associated with a third subnode A and a third subnode B. A size of a storage space occupied by data of a subtree using the second subnode as a root node is greater than a preset maximum storage space amount.

Therefore, referring to FIG. 5E (2), according to the maximum storage space amount, the subtree is split into two to-be-stored nodes, which are a to-be-stored node A and a to-be-stored node B. It is assumed that the to-be-stored node A includes the second subnode and the third subnode A, and a size of a storage space occupied by the to-be-stored node A is equal to the preset maximum storage space amount; and the to-be-stored node B includes the third subnode B, and a size of a storage space occupied by the to-be-stored node B is less than the preset maximum storage space amount.

Therefore, referring to FIG. 5E (3), after the two to-be-stored nodes are obtained, a first node offset address set in the first node disk block in which the corresponding first subnode is located is used as a starting address, and two second node offset addresses, which are a second node offset address A and a second node offset address B, are generated. The second node offset address A is the first node offset address. A traversing order of the two to-be-stored nodes is that the to-be-stored node A is first traversed, and the to-be-stored node B is then traversed. In this way, the first node offset address is configured for indicating the physical address A of the second node disk block A. The second node disk block A is established according to the first node offset address, and the second node offset address B is set in the second node disk block A, and configured for indicating a physical address B of the second node disk block B. The second node disk block B is established still according to the second node offset address B. The second node disk block A is configured to store data of the second subnode and data of the third subnode A. The second node disk block B is configured to store data of the third subnode B.

In an embodiment, in the memory or the disk, data in the memory or the disk may be merged regularly or irregularly in a compaction manner, for example, duplicated data is deleted. For example, during commit write, or when storage space data of the memory or the disk reaches a space threshold, or when a regular merging moment is preset, merging processing may be performed on the data in the memory or the disk, which is not specifically limited.

In an embodiment, the memory data and the disk data may be obtained synchronously. For example, after the root node is generated in the memory, the root node data is serialized in the disk, to establish a root node disk block corresponding to the root node in the disk. Further, after each first subnode associated with the root node is generated in the memory, data of each generated first subnode is serialized in the disk, to establish a first node disk block corresponding to the first subnode in the disk, and the like. Alternatively, complete memory data may be first obtained, and then complete disk data is obtained based on the obtained memory data. This is not specifically limited.

In an embodiment, in a process of obtaining the memory data of the tree structure, since the to-be-stored data of the graph structure may be dynamically adjusted according to a real-time input of the client, the memory data may also be adjusted with adjustment of the to-be-stored data of the graph structure.

For example, still referring to FIG. 4A, for the memory data, the first subnode A associated with the root node, the second subnode A and the second subnode B that are associated with the first subnode A, the third subnode B associated with the second subnode A, and the third subnode C and the third subnode D that are associated with the second subnode B may be first generated. The third subnode A associated with the second subnode A is then generated based on adjustment of the to-be-stored data of the graph structure.

For another example, still referring to FIG. 4A, for the memory data, the first subnode A associated with the root node, and the second subnode A and the second subnode B that are associated with the first subnode A may be first generated. The second subnode A is then modified based on adjustment of the to-be-stored data of the graph structure.

For another example, still referring to FIG. 4A, for the memory data, the first subnode A associated with the root node, the second subnode A and the second subnode B that are associated with the first subnode A, and the third subnode A and the third subnode B that are associated with the second subnode A may be first generated. The third subnode A is then modified based on adjustment of the to-be-stored data of the graph structure.

A process of modifying data of a specified subnode in each second subnode and each third subnode is used as an example for description below.

Referring to FIG. 6A, when a modification instruction for data of the specified subnode in each second subnode and each third subnode is received, the data of the specified subnode is duplicated from the memory data, to obtain data of a duplicated subnode. The data of the duplicated subnode is modified based on modification content indicated by the modification instruction, to obtain data of a modified subnode. The specified subnode is replaced with the obtained modified subnode, to obtain modified memory data.

The modification instruction may be generated in response to a modification operation triggered by the client for data of the specified subnode; or may be generated in response to an adjustment operation triggered by the client for vertex data (or edge data) in data of a graph structure corresponding to the specified subnode; or may be a preset timing modification instruction, or the like, which is not specifically limited. The specified subnode is, for example, a specified subnode that needs to be modified in the modification instruction. The modification instruction may indicate content of modification performed on the specified subnode. For example, when the specified subnode is the second subnode, the modification instruction may indicate to modify attribute information in vertex data of a corresponding vertex, or may indicate to modify a quantity of edges connected to a corresponding vertex.

After the modification, the duplicated subnode and the specified subnode may be deleted through the merging processing described above, which is equivalent to a process such as releasing the storage space.

In an embodiment, with reference to the foregoing descriptions, in the memory data, the first node pointer is set for each first subnode. The first node pointer is configured for indicating a storage position of the second subnode associated with the corresponding first subnode. The second node pointer set for each second subnode. The second node pointer is configured for indicating the storage position of the third subnode associated with the corresponding second subnode. A replacement pointer is set for each second subnode and each third subnode. When the replacement pointer is configured for indicating a storage position of to-be-replaced data of the second subnode or to-be-replaced data of the third subnode, the specified subnode may be modified by using a compare-and-swap (CAS) method and an appending method.

After the data of the specified subnode is duplicated, to obtain the data of the duplicated subnode, and the data of the duplicated subnode is modified, to obtain the data of the modified subnode, the replacement pointer of the modified subnode is pointed to a storage position of the specified subnode. A target pointer that indicates the storage position of specified subnode in each first node pointer and each second node pointer of the memory data is recognized. The target pointer is modified into indicating a storage position of the data of the modified subnode, to obtain the modified memory data.

For example, still based on FIG. 4A, after a modification instruction for the second subnode A is received, the second subnode A is a specified subnode. The second subnode A is a storage position indicated by the first node pointer set for the first subnode A. The second subnode A is associated with the third subnode A and the third subnode B. Referring to FIG. 6B (1), the second subnode A includes attribute information A of a vertex A, and further includes an edge quantity A of outgoing edges and an edge quantity B of incoming edges connected to the vertex A. The third subnode A includes index information in edge data of the outgoing edges connected to the vertex A, for example, including e1, e2, e3, and e4, and attribute information in the edge data of the outgoing edges, for example, including e1_prop, e2_prop, e3_prop, and e4_prop. The third subnode B includes index information in edge data of the incoming edges connected to the vertex A, for example, including e5, e6, 7, and e8, and attribute information in the edge data of the incoming edges, for example, including e5_prop, e6_prop, e7_prop, and e8_prop.

The second node pointer A and the second node pointer B are set for the second subnode A. The second node pointer A corresponds to the edge quantity A, and is configured for indicating the storage position A of the third subnode A. The second node pointer B corresponds to the edge quantity B, and is configured for indicating the storage position B of the third subnode B.

The replacement pointer is further set for the second subnode A. Currently, the replacement pointer is null, indicating that the second subnode A is not configured for replacing content in any storage position.

Referring to FIG. 6B (2), when the modification instruction for the second subnode A is received, indicating to modify the attribute information A of the vertex A into the attribute information B, the data of the second subnode A is duplicated, to obtain the data of the duplicated subnode. When the data of the duplicated subnode is obtained, the replacement pointer of the duplicated subnode may be pointed to the storage position (not shown in the figure) of the data of the second subnode A. Therefore, when the data of the modified subnode is obtained based on the data of the duplicated subnode, the replacement pointer of the modified subnode also points to the storage position of the data of the second subnode A, representing that the data of the modified subnode is used for replacing the data of the specified subnode. The attribute information A of the vertex A included in the duplicated subnode is then modified into the attribute information B, to obtain the modified subnode.

Based on FIG. 4A, it is determined that, in the data of each first node pointer and the data of each second node pointer of the memory data, a target pointer indicating the storage position of the data of the second subnode A is the first node pointer set in the first subnode A. In this way, the first node pointer of the first subnode A is modified from indicating the storage position of the data of the second subnode A into indicating the storage position of the data of the modified subnode, so that the modified memory data can be obtained.

For another example, still based on FIG. 4A, after a modification instruction for the data of the third subnode A is received, the third subnode A is a specified subnode. The third subnode A is a storage position indicated by the second node pointer set by the second subnode A. The second subnode A includes attribute information A of the vertex A, and further includes an edge quantity A of outgoing edges and an edge quantity B of incoming edges connected to the vertex A. Referring to FIG. 6C (1), the third subnode A includes index information in edge data of the outgoing edges connected to the vertex A, for example, including e1, e2, e3, and e4, and attribute information in the edge data of the outgoing edges, for example, including e1_prop, e2_prop, e3_prop, and e4_prop.

The replacement pointer is set for the third subnode A. Currently, the replacement pointer is null, indicating that the data of the third subnode A is not configured for replacing content in any storage position.

Referring to FIG. 6C (2), when the modification instruction for the third subnode A is received, indicating to modify the attribute information e1_prop of the outgoing edge e1 into e1'_prop, the data of the third subnode A is duplicated, to obtain the duplicated subnode. When the data of the duplicated subnode is obtained, the replacement pointer of the duplicated subnode may be pointed to the storage position (not shown in the figure) of the data of the third subnode A. Therefore, when the data of the modified subnode is obtained based on the data of the duplicated subnode, the replacement pointer of the modified subnode also points to the storage position of the data of the third subnode A. Then the attribute information e1_prop of the outgoing edge e1 included in the duplicated subnode is modified into e1'_prop, and the data of the modified subnode is obtained.

Based on FIG. 4A, it is determined that, in each first node pointer and each second node pointer of the memory data, a target pointer indicating the storage position of the third subnode A is the second node pointer set for the second subnode A. In this way, the second node pointer of the second subnode A is modified from indicating the third subnode A into indicating the storage position of the data of the modified subnode, so that the modified memory data can be obtained.

An example of the data storage method provided in the embodiments of the present disclosure is described below based on to-be-stored data of the graph structure shown in FIG. 3.

Referring to FIG. 7A, a root node is generated in the memory. Based on a storage occupation amount of data of each vertex included in the to-be-stored data, the index information in the vertex data of the four vertexes is divided into two vertex index information groups, which are a first vertex index information group and a second vertex index information group, according to a preset storage volume of the first subnode. The first vertex index information group includes index information of the first function and index information of the second function. The second vertex index information group includes index information of the third function and index information of the fourth function.

According to a group quantity of the vertex index information groups, two root node pointers are set for the root node, which are a first root node pointer and a second root node pointer. The first root node pointer is configured for indicating a storage position of data of the first subnode A associated with the root node, and the second root node pointer is configured for indicating a storage position of data of the first subnode B associated with the root node.

The first vertex index information group is stored into a storage position indicated by the first root node pointer, to generate the first subnode A; and the second vertex index information group is stored into a storage position indicated by the second root node pointer, to generate the first subnode B.

According to a quantity of vertexes corresponding to the index information in the vertex data of the vertex included in the first subnode A, two first node pointers, which are the first node pointer A and the first node pointer B, are set for the first subnode A. The first node pointer A is configured for indicating the storage position of the second subnode A associated with the first subnode A; and the first node pointer B is configured for indicating the storage position of the second subnode B associated with the first subnode A.

According to a quantity of vertexes corresponding to the index information in the vertex data of the vertex included in the first subnode B, two first node pointers, which are the first node pointer C and the first node pointer D, are set for the first subnode B. The first node pointer C is configured for indicating the storage position of the second subnode C associated with the first subnode B; and the first node pointer D is configured for indicating the storage position of the second subnode D associated with the first subnode B.

According to the to-be-stored data, an edge quantity of outgoing edges connected to the first function is counted 4, and an edge quantity of incoming edges connected to the first function is counted 4; an edge quantity of outgoing edges connected to the second function is counted 1, and an edge quantity of incoming edges connected to the second function is counted 1; an edge quantity of outgoing edges connected to the third function is counted 1, and an edge quantity of incoming edges connected to the third function is counted 1; and an edge quantity of outgoing edges connected to the fourth function is counted 1, and an edge quantity of incoming edges connected to the fourth function is counted 1.

The attribute information of the first function, and a quantity of edges belonging to an edge category A and a quantity of edges belonging to an edge category B are stored into the storage position indicated by the first node pointer A, to generate the second subnode A. The attribute information of the second function, and a corresponding quantity of edges belonging to the edge category A and a corresponding quantity of edges belonging to the edge category B are stored into the storage position indicated by the first node pointer B, to generate the second subnode B. The attribute information of the third function, and a corresponding quantity of edges belonging to the edge category A and a corresponding quantity of edges belonging to the edge category B are stored into the storage position indicated by the first node pointer C, to generate the second subnode C. The attribute information of the fourth function, and a corresponding quantity of edges belonging to the edge category A and a corresponding quantity of edges belonging to the edge category B are stored into the storage position indicated by the first node pointer D, to generate the second subnode D.

According to a category quantity of the edge categories included in the second subnode A, which are two edge categories: the outgoing edge and the incoming edge, two second node pointers, which are the second node pointer A and the second node pointer B, are set for the second subnode A. The second node pointer A is configured for indicating the storage position of the third subnode A associated with the second subnode A. The second node pointer B is configured for indicating the storage position of the third subnode B associated with the second subnode A.

Similarly, two second node pointers, which are the second node pointer C and the second node pointer D, are set for the second subnode B. The second node pointer C is configured for indicating the storage position of the third subnode C associated with the second subnode C. The second node pointer D is configured for indicating the storage position of the data of the third subnode D associated with the second subnode B.

Two second node pointers, which are the second node pointer E and the second node pointer F, are set for the second subnode C. The second node pointer E is configured for indicating the storage position of the data of the third subnode E associated with the second subnode C. The second node pointer F is configured for indicating the storage position of the data of the third subnode F associated with the second subnode C.

Two second node pointers, which are the second node pointer G and the second node pointer H, are set for the second subnode D. The second node pointer G is configured for indicating the storage position of the data of the third subnode G associated with the second subnode D. The second node pointer H is configured for indicating the storage position of the data of the third subnode H associated with the second subnode D.

Index information in edge data of the outgoing edges connected to the first function, which are e1, e2, e3, and e4, and attribute information in the edge data of the outgoing edges connected to the first function, which are e1_prop, e2_prop, e3_prop, and e4_prop, are stored into the storage position indicated by the second node pointer A, to generate the third subnode A.

Index information in edge data of the incoming edges connected to the first function, which are e5, e6, e7, and e8, and attribute information in the edge data of the incoming edges connected to the first function, which are e5_prop, e6_prop, e7_prop, and e8_prop, are stored into the storage position indicated by the second node pointer B, to generate the third subnode B.

Index information in edge data of the outgoing edges connected to the second function, which is e9, and attribute information in the edge data of the outgoing edges connected to the second function, which is e9_prop, are stored into the storage position indicated by the second node pointer C, to generate the data of the third subnode C.

Index information in edge data of the incoming edges connected to the second function, which is e10, and attribute information in the edge data of the incoming edges connected to the second function, which is e10_prop, are stored into the storage position indicated by the second node pointer D, to generate the data of the third subnode D.

Index information in edge data of the outgoing edges connected to the third function, which is e11, and attribute information in the edge data of the outgoing edges connected to the third function, which is e11_prop, are stored into the storage position indicated by the second node pointer E, to generate the data of the third subnode E.

Index information in edge data of the incoming edges connected to the third function, which is e12, and attribute information in the edge data of the incoming edges connected to the third function, which is e12_prop, are stored into the storage position indicated by the second node pointer F, to generate the data of the third subnode F.

Index information in edge data of the outgoing edges connected to the fourth function, which is e13, and attribute information in the edge data of the outgoing edges connected to the fourth function, which is e13_prop, are stored into the storage position indicated by the second node pointer G, to generate the third subnode G.

Index information in edge data of the incoming edges connected to the fourth function, which is e14, and attribute information in the edge data of the incoming edges connected to the fourth function, which is e14_prop, are stored into the storage position indicated by the second node pointer H, to generate the data of the third subnode H.

Therefore, the memory data of the tree structure may be obtained from the memory. The tree structure may be considered as a two-level tree-like structure. Referring to FIG. 7B, the root node, the first subnode A and the first subnode B, and the second subnode A, the second subnode B, the second subnode C, and the second subnode D are used as one level of the tree-like structure. The tree-like structure is similar to a tree-like structure of a B+ tree. In addition, each second subnode is used as a root node, and the third subnode A, the third subnode B, the third subnode C, the third subnode D, the third subnode E, the third subnode F, the third subnode G, and the third subnode H are used as the other level of the tree-like structure. The tree-like structure is similar to a tree-like structure of a trie tree.

After the memory data is obtained, referring to FIG. 7C, a root node disk block corresponding to the root node is established according to a size of a storage space occupied by the root node. The root node disk block is configured to store data included in the root node. According to a quantity of the first subnode associated with the root node, two root node offset addresses, which are the root node offset address A and the root node offset address B, are set for the root node disk block.

According to the size of the storage space occupied by each first subnode, the first node disk block A corresponding to the first subnode A is established at the physical address indicated by the root node offset address A. The first node disk block A is configured to store the data included in the first subnode A. The first node disk block B corresponding to the first subnode B is established at the physical address indicated by the root node offset address B. The first node disk block B is configured to store data included in the first subnode B.

According to a quantity of second subnodes associated with the first subnode, two first node offset addresses, which are the first node offset address A and the first node offset address B, are set for the first node disk block A. Two first node offset addresses, which are the first node offset address C and the first node offset address D, are set for the first node disk block B.

Since the size of the storage space occupied by the subtree using the second subnode A as the root node is greater than the preset maximum storage space amount, the subtree is split into two to-be-stored nodes. The to-be-stored node A includes the second subnode A and the third subnode A; and the to-be-stored node B includes the third subnode B.

The data included in the to-be-stored node A is packed and stored into the physical address indicated by the first node offset address A in a page aggregation manner, to obtain the second node disk block A. The second node offset address is set for the second node disk block A, and is configured for indicating a physical address of the second node disk block B. The second node disk block B is configured to store the data included in the to-be-stored node B.

Since the size of the storage space occupied by the subtree using the second subnode B as the root node is not greater than the preset maximum storage space amount, the data included in the subtree is packed and stored into a physical address indicated by the first node offset address B in a page aggregation manner, to obtain the subtree disk block A. Since the size of the storage space occupied by the subtree using the second subnode C as the root node is not greater than the preset maximum storage space amount, the data included in the subtree is packed and stored into a physical address indicated by the first node offset address C in a page aggregation manner, to obtain the subtree disk block B. Since the size of the storage space occupied by the subtree using the second subnode D as the root node is not greater than the preset maximum storage space amount, the data included in the subtree is packed and stored into a physical address indicated by the first node offset address D in a page aggregation manner, to obtain the subtree disk block C. Therefore, the disk data of the tree structure can be obtained in the memory.

In this embodiment of the present disclosure, in the memory, the two-level tree-like structure is used to store the to-be-stored data of the graph structure. The tree-like structure similar to the B+ tree is used for the index information in the vertex data of the vertex, and the tree-like structure similar to the trie tree is used for representation of the edges adjacent to the vertex to classify the edges corresponding to the vertex and belonging to different edge categories. A size of a memory space of a node used in a tree-like structure similar to a trie tree and a size of a storage space of a disk block are different. Therefore, a loose structure of each node in the memory may not be limited by a disk storage manner, facilitating constructing a lock-free multi-core concurrency structure. Therefore, concurrency of write or modification operations on an edge is improved, and an overall write capability of the graph is improved.

In a disk, as many sequential reads and writes as possible are used to improve read/write performance on the disk and improve efficiency of the I/O operations. For the tree-like structure similar to the B+ tree, the modification operation on the index information in the vertex data of the vertex is implemented in a read/write duplication manner, and leaf nodes of the tree-like structure similar to the B+ tree are written in an append-only manner. For edges stored in the tree-like structure similar to the trie tree, data of the same subtree is serialized to the same physical address as much as possible, thereby ensuring that the same vertex and all edges of the vertex can be stored in the physical space of the same disk block (or adjacent disk blocks) on the disk. For a vertex with a large number of edges (such as a super hotspot), the edges of the vertex are divided into different disk blocks in a paging manner, and the disk blocks are organized in a form of a linked list, to form disk blocks with adjacent logical addresses. Therefore, when the disk data is queried and analyzed, an advantage that sequential read or write performance of the disk is higher than random read/write performance may be fully utilized, to change the I/O operation on the disk into a sequential I/O operation, thereby speeding up the query.

Therefore, the data storage method provided in the embodiments of the present disclosure can realize an OLTP property of graph data, and can realize a high-performance OLAP task through OLTP in an efficient data organization form, so that defects in which current data in the graph structure cannot take account of both the OLAP or the OLTP can be greatly improved.

Based on the same inventive concept, an embodiment of the present disclosure provides a data storage apparatus, which can implement functions corresponding to the data storage method. Referring to FIG. 8, the apparatus includes an obtaining module 801 and a processing module 802.

The obtaining module 801 is configured to obtain data of a graph structure, the data of the graph structure including vertex data of at least one vertex of the graph structure and edge data of at least one edge of the graph structure.

The processing module 802 is configured to establish memory data of a tree structure for the data of the graph structure in the memory. Specifically, based on index information in vertex data of each vertex in the data of the graph structure, data of a root node of the tree structure and data of at least one first subnode associated with the root node are generated in the memory, the data of the root node indicating a storage position of the data of the at least one first subnode in the memory, and data of each first subnode including index information in vertex data of at least one vertex; based on attribute information in the vertex data of the vertex, data of at least one second subnode associated with each first subnode is generated, data of each second subnode including attribute information in vertex data of a corresponding vertex; and based on index information in edge data of each edge and attribute information in the edge data of the edge in the data of the graph structure, data of at least one third subnode associated with each second subnode is generated, data of each third subnode including attribute information and index information in edge data of at least one edge.

The processing module 802 is further configured to: establish a plurality of disk blocks in a disk based on the memory data, and store the data of the root node, the data of each first subnode, and data of a subtree using each second subnode as a root node into corresponding disk blocks respectively, to obtain disk data of the tree structure.

A more specific implementation of the apparatus 800 is consistent with the description of the data storage method, and details are not described herein again.

Referring to FIG. 9, the data storage apparatus may run on a computer device 900. A current version and a historical version of a data storage program and application software corresponding to the data storage program may be installed on the computer device 900. The computer device 900 includes a processor 980 and a memory 920. In some embodiments, the computer device 900 may include a display unit 940. The display unit 940 includes a display panel 941, configured to display an operating interface for user interaction and the like.

In a possible embodiment, the display panel 941 may be configured by using a liquid crystal display (LCD) or an organic light-emitting diode (OLED), or in another form.

The processor 980 is configured to read a computer program and then perform a method defined by the computer program. For example, the processor 980 reads a data storage program, a file, or the like, to run the data storage program on the computer device 900, and display a corresponding interface on the display unit 940. The processor 980 may include one or more general-purpose processors, or may further include one or more digital signal processors (DSP), configured to perform related operations, to implement the technical solutions provided in the embodiments of the present disclosure.

The memory 920 generally includes an internal memory and an external memory. The internal memory may be a random access memory (RAM), a read-only memory (ROM), a cache, or the like. The external memory may be a hard disk, an optical disc, a USB disk, a floppy disk, a tape drive, or the like. The memory 920 is configured to store a computer program and other data. The computer program includes an application program corresponding to each client, and the like. The other data may include data generated after an operating system or the application program is run. The data includes system data (for example, a configuration parameter of the operating system) and user data. In this embodiment of the present disclosure, a program instruction is stored in the memory 920. The processor 980 executes the program instruction in the memory 920, to implement any method discussed above.

The display unit 940 is configured to receive inputted digital information, character information, or a contact touch operation/non-contact gesture, and generate a signal input related to user settings and function control of the computer device 900, and the like. Specifically, in this embodiment of the present disclosure, the display unit 940 may include the display panel 941. The display panel 941 is, for example, a touch screen, and may collect a touch operation (for example, an operation by the user on the display panel 941 by using any suitable object or accessory such as a finger or a stylus) of the user on or near the display panel 941, and drive a corresponding connection apparatus according to a preset program.

In a possible embodiment, the display panel 941 may include two parts: a touch detection apparatus and a touch controller. The touch detection apparatus detects a touch orientation of the player, detects a signal brought by a touch operation, and transmits the signal to the touch controller. The touch controller receives touch information from the touch detection apparatus, converts the touch information into contact coordinates, and transmits the touch information to the processor 980, and can receive and execute a command from the processor 980.

The display panel 941 may be of a plurality of types such as a resistive type, a capacitive type, an infrared ray, or a surface acoustic wave. In addition to the display unit 940, in some embodiments, the computer device 900 may further include an input unit 930. The input unit 930 may include an image input device 931 and another input device 932. The another input device may include, but is not limited to, one or more of a physical keyboard, a function key (such as a volume control key and a switch key), a trackball, a mouse, a joystick, and the like.

In addition, the computer device 900 may further include a power supply 990 configured to supply power to other modules, an audio circuit 960, a near field communication module 970, and a radio frequency (RF) circuit 910. The computer device 900 may further include one or more sensors 950, such as an acceleration sensor, a light sensor, and a pressure sensor. The audio circuit 960 specifically includes a speaker 961, a microphone 962, and the like. For example, the computer device 900 may collect sound of a user through the microphone 962, to perform a corresponding operation, and the like.

In an embodiment, there may be one or more processors 980, and the processor 980 and the memory 920 may be arranged in a coupled manner, or may be arranged relatively independently.

In an embodiment, the processor 980 in FIG. 9 may be configured to implement functions of the obtaining module 801 and the processing module 802 in FIG. 8.

In an embodiment, the processor 980 in FIG. 9 may be configured to implement the functions corresponding to the server or the terminal device described above.

In various embodiments in the present disclosure, a "first subnode" may be refer to as a "first-subnode", indicating a subnode at one level below a root-node; a "second subnode" may be refer to as a "second-subnode", indicating a subnode at two levels below a root-node or one level below a first-subnode; a "third subnode" may refer to as a "third-subnode", indicating a subnode at three levels below a root-node or two levels below a first-subnode or one level below a second-subnode.

A person of ordinary skill in the art may understand: all or some of the operations of the method embodiments may be implemented by a program instructing relevant hardware. The program may be stored in a computer-readable storage medium. When the program is executed, the operations including the method embodiments are performed. The foregoing storage medium includes: various media that can store program code, such as a mobile storage device, a read-only memory (ROM), a random access memory (RAM), a magnetic disk, or an optical disc.

Alternatively, when the integrated unit in the present disclosure is implemented in a form of a software functional module and sold or used as an independent product, the integrated unit may be stored in a computer-readable storage medium. Based on such understanding, the technical solutions of the embodiments of the present disclosure essentially, or the part contributing to the related art may be implemented in a form of a software product, for example, implemented through a computer program product. The computer software product is stored in a storage medium, and includes several instructions for instructing a computer device to perform all or some of the methods described in the embodiments of the present disclosure. The foregoing storage medium includes: various media that can store program code, such as a mobile storage device, a ROM, a RAM, a magnetic disk, or an optical disc.

In the embodiments of the present disclosure, the term "module" or "unit" refers to a computer program or a part of the computer program having a predetermined function, and operating with other related parts to achieve a predetermined objective, and may be implemented entirely or partially by using software, hardware (such as a processing circuit or a memory), or a combination thereof. Similarly, one processor (or a plurality of processors or memories) may be configured to implement one or more modules or units. In addition, each module or unit may be a part of an overall module or unit including a function of the module or unit.

In some embodiments, a computer-readable medium comprising instructions which, when executed by a computer, cause the computer to carry out a portion or all of the above methods. The computer-readable medium may be referred as non-transitory computer-readable media (CRM) that stores data for extended periods such as a flash drive or compact disk (CD), or for short periods in the presence of power such as a memory device or random access memory (RAM). In some embodiments, computer-readable instructions may be included in a software, which is embodied in one or more tangible, non-transitory, computer-readable media. Such non-transitory computer-readable media can be media associated with user-accessible mass storage as well as certain short-duration storage that are of non-transitory nature, such as internal mass storage or ROM. The software implementing various embodiments of the present disclosure can be stored in such devices and executed by a processor (or processing circuitry). A computer-readable medium can include one or more memory devices or chips, according to particular needs. The software can cause the processor (including CPU, GPU, FPGA, and the like) to execute particular processes or particular parts of particular processes described herein, including defining data structures stored in RAM and modifying such data structures according to the processes defined by the software. In various embodiments in the present disclosure, the term "processor" may mean one processor that performs the defined functions, steps, or operations or a plurality of processors that collectively perform defined functions, steps, or operations, such that the execution of the individual defined functions may be divided amongst such plurality of processors.

Apparently, a person skilled in the art can make various modifications and variations to the present disclosure without departing from the spirit and scope of the present disclosure. In this way, if the modifications and variations made to the present disclosure fall within the scope of the claims of the present disclosure and their equivalent technologies, the present disclosure is intended to include these modifications and variations.

What is claimed is:

1. A method for generating tree-structure storage data for a graph structure, performed by a computer device, the method comprising:

obtaining data of a graph structure, the data of the graph structure comprising vertex data of at least one vertex of the graph structure and edge data of at least one edge of the graph structure;

constructing memory data of a tree structure for the data of the graph structure in a memory of the computer device, by:

generating, in the memory based on index information in vertex data of each vertex in the data of the graph structure, data of a root node of the tree structure and data of at least one first-subnode associated with the root node of the tree structure, the data of the root node indicating a storage position of the data of the at least one first-subnode in the memory, and data of each first-subnode comprising index information in vertex data of at least one vertex;

generating, based on attribute information in the vertex data of the vertex, data of at least one second-subnode associated with each first-subnode of the tree structure, data of each second-subnode comprising attribute information in vertex data of a corresponding vertex; and generating, based on index information in edge data of each edge and attribute information in the edge data of the edge in the data of the graph structure, data of at least one third-subnode associated with each second-subnode of the tree structure, data of each third-subnode comprising attribute information and index information in edge data of at least one edge;

constructing a plurality of disk blocks in a storage device based on the memory data of the tree structure by:

establishing, based on a size of a storage space occupied by the data of the root node, a root node disk block for storing the data of the root node, setting at least one root node offset address for the root node disk block based on a quantity of first-subnodes, each root node offset address being configured for indicating a physical address of a disk block adjacent to a logical address of the root node disk block, establishing, based on a size of a storage space occupied by the data of each first-subnode and a corresponding root node offset address, a first node disk block corresponding to the first-subnode, setting at least one first node offset address for the corresponding first node disk block based on a quantity of second-subnodes associated with each first-subnode, each first node offset address being configured for indicating a physical address of a disk block adjacent to a logical address of the first node disk block, and establishing, based on a size of a storage space occupied by the data of the subtree using each second-subnode as the root node and a corresponding first node offset address, a subtree disk block corresponding to the corresponding subtree; and storing the data of the root node, the data of each first-subnode, and data of the subtree using each second-subnode as the root node into corresponding disk blocks respectively, to obtain the storage data of the tree structure for the graph structure.

2. The method according to claim 1, wherein the generating, in the memory based on index information in vertex data of each vertex in the data of the graph structure, the data of the root node of the tree structure and the data of the at least one first-subnode associated with the root node of the tree structure comprises:

dividing the index information in the vertex data of the vertex into at least one vertex index information group, each vertex index information group comprising index information in vertex data of at least one vertex; and generating, in the memory based on the at least one vertex index information group, the data of the root node of the tree structure and the data of the at least one first-subnode associated with the root node, the data of each first-subnode comprising one corresponding vertex index information group.

3. The method according to claim 2, wherein the dividing the index information in the vertex data of the vertex into at least one vertex index information group comprises:

obtaining a data volume of the index information in the vertex data of the vertex; and dividing the index information in the vertex data of the vertex into the at least one vertex index information group based on the data volume of the index information in the vertex data of the vertex and a preset storage volume for the data of the first-subnode, each vertex index information group comprising index information in vertex data of at least one vertex.

4. The method according to claim 2, wherein the generating, in the memory based on the at least one vertex index information group, the data of the root node of the tree structure and the data of the at least one first-subnode associated with the root node comprises:

establishing the root node in the memory;

setting, based on a group quantity of the at least one vertex index information group, at least one root node pointer for the root node as the data of the root node, each root node pointer is configured for indicating a storage position of data of one first-subnode associated with the root node in the memory; and respectively storing the at least one vertex index information group into a storage position indicated by a corresponding root node pointer, to obtain the data of the at least one first-subnode associated with the root node.

5. The method according to claim 1, wherein the generating, based on attribute information in the vertex data of the vertex, the data of at least one second-subnode associated with each first-subnode of the tree structure comprises:

performing the following operations for each first-subnode:

setting at least one first node pointer for one first-subnode based on a vertex quantity corresponding to the index information comprised in the first-subnode, each first node pointer is configured for indicating a storage position of data of one second-subnode associated with the first-subnode in the memory; and respectively storing the attribute information in the vertex data of the at least one vertex indicated by the data of the first-subnode into a storage position indicated by a corresponding first node pointer, to obtain data of at least one second-subnode associated with the first-subnode.

6. The method according to claim 5, wherein the respectively storing the attribute information in the vertex data of the at least one vertex indicated by the data of the first-subnode into the storage position indicated by the corresponding first node pointer, to obtain data of at least one second-subnode associated with the first-subnode comprises:

performing the following operations for the at least one vertex indicated by the data of the first-subnode:

separately counting, based on a plurality of preset edge categories, an edge quantity of edges connected to the vertex and belonging to each edge category; and storing the attribute information in the vertex data of the vertex and the counted edge quantity of edges of each edge category into the storage position indicated by the first node pointer corresponding to the vertex, to obtain data of a second-subnode associated with the first-subnode.

7. The method according to claim 1, wherein, the generating, based on index information in edge data of each edge and attribute information in the edge data of the edge in the data of the graph structure, data of at least one third-subnode associated with each second-subnode of the tree structure comprises:

performing the following operations for each second-subnode:

setting, for each of at least one edge category, a second node pointer corresponding to the edge category for the second-subnode, the second node pointer associated with each edge category being configured for indicating a storage position of data of a third-subnode associated with the second-subnode;

separately determining an edge belonging to each edge category in edges connected to a vertex corresponding to the data of the second-subnode; and separately storing the index information and the attribute information in the edge data of the edge of each edge category into a storage position indicated by the corresponding second node pointer, to obtain the data of the at least one third-subnode associated with the second-subnode.

8. The method according to claim 1, wherein the establishing, based on the size of the storage space occupied by the data of the subtree using each second-subnode as the root node and the corresponding first node offset address, the subtree disk block corresponding to the corresponding subtree comprises:

performing the following operations for each subtree:

determining the size of the storage space occupied by the data of the subtree, and when the storage space is greater than a preset maximum storage space amount, splitting the data of the subtree according to the maximum storage space amount, to obtain a plurality of data blocks;

generating, using the corresponding first node offset address as a starting address, a plurality of second node offset addresses based on a quantity of the plurality of data blocks, and establishing, based on a traversing order of the subtree, second node disk blocks respectively corresponding to the plurality of data blocks according to the plurality of second node offset addresses.

9. An apparatus for generating tree-structure storage data for a graph structure, the apparatus comprising:

a memory storing instructions; and a processor in communication with the memory, wherein, when the processor executes the instructions, the processor is configured to cause the apparatus to perform:

obtaining data of a graph structure, the data of the graph structure comprising vertex data of at least one vertex of the graph structure and edge data of at least one edge of the graph structure;

constructing memory data of a tree structure for the data of the graph structure in a memory of the apparatus, by:

generating, in the memory based on index information in vertex data of each vertex in the data of the graph structure, data of a root node of the tree structure and data of at least one first-subnode associated with the root node of the tree structure, the data of the root node indicating a storage position of the data of the at least one first-subnode in the memory, and data of each first-subnode comprising index information in vertex data of at least one vertex;

generating, based on attribute information in the vertex data of the vertex, data of at least one second-subnode associated with each first-subnode of the tree structure, data of each second-subnode comprising attribute information in vertex data of a corresponding vertex; and generating, based on index information in edge data of each edge and attribute information in the edge data of the edge in the data of the graph structure, data of at least one third-subnode associated with each second-subnode of the tree structure, data of each third-subnode comprising attribute information and index information in edge data of at least one edge;

constructing a plurality of disk blocks in a storage device based on the memory data of the tree structure by:

establishing, based on a size of a storage space occupied by the data of the root node, a root node disk block for storing the data of the root node, setting at least one root node offset address for the root node disk block based on a quantity of first-subnodes, each root node offset address being configured for indicating a physical address of a disk block adjacent to a logical address of the root node disk block, establishing, based on a size of a storage space occupied by the data of each first-subnode and a corresponding root node offset address, a first node disk block corresponding to the first-subnode, setting at least one first node offset address for the corresponding first node disk block based on a quantity of second-subnodes associated with each first-subnode, each first node offset address being configured for indicating a physical address of a disk block adjacent to a logical address of the first node disk block, and establishing, based on a size of a storage space occupied by the data of the subtree using each second-subnode as the root node and a corresponding first node offset address, a subtree disk block corresponding to the corresponding subtree; and storing the data of the root node, the data of each first-subnode, and data of the subtree using each second-subnode as the root node into corresponding disk blocks respectively, to obtain the storage data of the tree structure for the graph structure.

10. The apparatus according to claim 9, wherein, when the processor is configured to cause the apparatus to perform generating, in the memory based on index information in vertex data of each vertex in the data of the graph structure, the data of the root node of the tree structure and the data of the at least one first-subnode associated with the root node of the tree structure, the processor is configured to cause the apparatus to perform:

dividing the index information in the vertex data of the vertex into at least one vertex index information group, each vertex index information group comprising index information in vertex data of at least one vertex; and generating, in the memory based on the at least one vertex index information group, the data of the root node of the tree structure and the data of the at least one first-subnode associated with the root node, the data of each first-subnode comprising one corresponding vertex index information group.

11. The apparatus according to claim 10, wherein, when the processor is configured to cause the apparatus to perform dividing the index information in the vertex data of the vertex into at least one vertex index information group, the processor is configured to cause the apparatus to perform:

obtaining a data volume of the index information in the vertex data of the vertex; and dividing the index information in the vertex data of the vertex into the at least one vertex index information group based on the data volume of the index information in the vertex data of the vertex and a preset storage volume for the data of the first-subnode, each vertex index information group comprising index information in vertex data of at least one vertex.

12. The apparatus according to claim 10, wherein, when the processor is configured to cause the apparatus to perform generating, in the memory based on the at least one vertex index information group, the data of the root node of the tree structure and the data of the at least one first-subnode associated with the root node, the processor is configured to cause the apparatus to perform:

establishing the root node in the memory;

setting, based on a group quantity of the at least one vertex index information group, at least one root node pointer for the root node as the data of the root node, each root node pointer is configured for indicating a storage position of data of one first-subnode associated with the root node in the memory; and respectively storing the at least one vertex index information group into a storage position indicated by a corresponding root node pointer, to obtain the data of the at least one first-subnode associated with the root node.

13. The apparatus according to claim 9, wherein, when the processor is configured to cause the apparatus to perform generating, based on attribute information in the vertex data of the vertex, the data of at least one second-subnode associated with each first-subnode of the tree structure, the processor is configured to cause the apparatus to perform:

performing the following operations for each first-subnode:

setting at least one first node pointer for one first-subnode based on a vertex quantity corresponding to the index information comprised in the first-subnode, each first node pointer is configured for indicating a storage position of data of one second-subnode associated with the first-subnode in the memory; and respectively storing the attribute information in the vertex data of the at least one vertex indicated by the data of the first-subnode into a storage position indicated by a corresponding first node pointer, to obtain data of at least one second-subnode associated with the first-subnode.

14. The apparatus according to claim 13, wherein, when the processor is configured to cause the apparatus to perform respectively storing the attribute information in the vertex data of the at least one vertex indicated by the data of the first-subnode into the storage position indicated by the corresponding first node pointer, to obtain data of at least one second-subnode associated with the first-subnode, the processor is configured to cause the apparatus to perform:

performing the following operations for the at least one vertex indicated by the data of the first-subnode:

separately counting, based on a plurality of preset edge categories, an edge quantity of edges connected to the vertex and belonging to each edge category; and storing the attribute information in the vertex data of the vertex and the counted edge quantity of edges of each edge category into the storage position indicated by the first node pointer corresponding to the vertex, to obtain data of a second-subnode associated with the first-subnode.

15. The apparatus according to claim 9, wherein, when the processor is configured to cause the apparatus to perform generating, based on index information in edge data of each edge and attribute information in the edge data of the edge in the data of the graph structure, data of at least one third-subnode associated with each second-subnode of the tree structure, the processor is configured to cause the apparatus to perform:

performing the following operations for each second-subnode:

setting, for each of at least one edge category, a second node pointer corresponding to the edge category for the second-subnode, the second node pointer associated with each edge category being configured for indicating a storage position of data of a third-subnode associated with the second-subnode;

separately determining an edge belonging to each edge category in edges connected to a vertex corresponding to the data of the second-subnode; and separately storing the index information and the attribute information in the edge data of the edge of each edge category into a storage position indicated by the corresponding second node pointer, to obtain the data of the at least one third-subnode associated with the second-subnode.

16. The apparatus according to claim 9, wherein, when the processor is configured to cause the apparatus to perform establishing, based on the size of the storage space occupied by the data of the subtree using each second-subnode as the root node and the corresponding first node offset address, the subtree disk block corresponding to the corresponding subtree, the processor is configured to cause the apparatus to perform:

performing the following operations for each subtree:

determining the size of the storage space occupied by the data of the subtree, and when the storage space is greater than a preset maximum storage space amount, splitting the data of the subtree according to the maximum storage space amount, to obtain a plurality of data blocks;

generating, using the corresponding first node offset address as a starting address, a plurality of second node offset addresses based on a quantity of the plurality of data blocks, and establishing, based on a traversing order of the subtree, second node disk blocks respectively corresponding to the plurality of data blocks according to the plurality of second node offset addresses.

17. A non-transitory computer-readable storage medium, storing computer-readable instructions, wherein, the computer-readable instructions, when executed by a processor of an apparatus, are configured to cause the processor to perform:

obtaining data of a graph structure, the data of the graph structure comprising vertex data of at least one vertex of the graph structure and edge data of at least one edge of the graph structure; constructing memory data of a tree structure for the data of the graph structure in a memory of the apparatus, by:

generating, in the memory based on index information in vertex data of each vertex in the data of the graph structure, data of a root node of the tree structure and data of at least one first-subnode associated with the root node of the tree structure, the data of the root node indicating a storage position of the data of the at least one first-subnode in the memory, and data of each first-subnode comprising index information in vertex data of at least one vertex;

generating, based on attribute information in the vertex data of the vertex, data of at least one second-subnode associated with each first-subnode of the tree structure, data of each second-subnode comprising attribute information in vertex data of a corresponding vertex; and

38 generating, based on index information in edge data of each edge and attribute information in the edge data of the edge in the data of the graph structure, data of at least one third-subnode associated with each second-subnode of the tree structure, data of each third-subnode comprising attribute information and index information in edge data of at least one edge;

constructing a plurality of disk blocks in a storage device based on the memory data of the tree structure by:

establishing, based on a size of a storage space occupied by the data of the root node, a root node disk block for storing the data of the root node, setting at least one root node offset address for the root node disk block based on a quantity of first-subnodes, each root node offset address being configured for indicating a physical address of a disk block adjacent to a logical address of the root node disk block, establishing, based on a size of a storage space occupied by the data of each first-subnode and a corresponding root node offset address, a first node disk block corresponding to the first-subnode, setting at least one first node offset address for the corresponding first node disk block based on a quantity of second-subnodes associated with each first-subnode, each first node offset address being configured for indicating a physical address of a disk block adjacent to a logical address of the first node disk block, and establishing, based on a size of a storage space occupied by the data of the subtree using each second-subnode as the root node and a corresponding first node offset address, a subtree disk block corresponding to the corresponding subtree; and storing the data of the root node, the data of each first-subnode, and data of the subtree using each second-subnode as the root node into corresponding disk blocks respectively, to obtain the storage data of the tree structure for the graph structure.

18. The non-transitory computer-readable storage medium according to claim 17, wherein, when the computer-readable instructions are configured to cause the processor to perform generating, in the memory based on index information in vertex data of each vertex in the data of the graph structure, the data of the root node of the tree structure and the data of the at least one first-subnode associated with the root node of the tree structure, the computer-readable instructions are configured to cause the processor to perform:

dividing the index information in the vertex data of the vertex into at least one vertex index information group, each vertex index information group comprising index information in vertex data of at least one vertex; and generating, in the memory based on the at least one vertex index information group, the data of the root node of the tree structure and the data of the at least one first-subnode associated with the root node, the data of each first-subnode comprising one corresponding vertex index information group.

* * * * *